US012695587B2

(12) United States Patent
Ibrahim et al.

(10) Patent No.: US 12,695,587 B2
(45) Date of Patent: Jul. 28, 2026

(54) POWER BOOSTING OF A CHANNEL STATE INFORMATION REFERENCE SIGNAL IN A SUB-BAND FULL DUPLEX SET OF SYMBOLS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 18/477,279

(22) Filed: Sep. 28, 2023

(65) Prior Publication Data

US 2025/0112752 A1      Apr. 3, 2025

(51) Int. Cl.
*H04L 5/14* (2006.01)
*H04L 5/00* (2006.01)
(52) U.S. Cl.
CPC .............. *H04L 5/14* (2013.01); *H04L 5/0057* (2013.01)
(58) Field of Classification Search
CPC ................................. H04L 5/14; H04L 5/0057
See application file for complete search history.

(56) References Cited

U.S. PATENT DOCUMENTS

| | | | | |
|---|---|---|---|---|
| 12,477,570 | B2 * | 11/2025 | Rudolf | ............... H04W 74/006 |
| 2021/0273774 | A1 * | 9/2021 | Abotabl | .................... H04L 5/14 |
| 2023/0328656 | A1 * | 10/2023 | Rudolf | ................. H04W 52/24 |
| 2024/0365292 | A1 * | 10/2024 | Farhoodi | .............. H04L 5/0053 |
| 2025/0056279 | A1 * | 2/2025 | Ly | .......... H04L 5/0057 |
| 2025/0106934 | A1 * | 3/2025 | Rudolf | ................. H04L 5/0053 |

FOREIGN PATENT DOCUMENTS

EP            4598185  A1 *  8/2025  ............ H04W 72/02

* cited by examiner

*Primary Examiner* — Deepa Belur
(74) *Attorney, Agent, or Firm* — Harrity & Harrity, LLP

(57) ABSTRACT

Various aspects of the present disclosure generally relate to wireless communication. More particularly, various aspects relate generally to power boosting a channel state information reference signal (CSI-RS) in a CSI-RS resource occasion occurring in a sub-band full duplex (SBFD) set of symbols and/or in a CSI-RS resource occasion that overlaps with an uplink sub-band and/or a guard band of the SBFD set of symbols. In some aspects, a network node may configure a UE with a CSI-RS resource associated with SBFD sets of symbols and non-SBFD sets of symbols. The network node may transmit, and the UE may receive, in an instance of the CSI-RS resource that occurs in an SBFD set of symbols, a CSI-RS. The CSI-RS may be associated with a power-boosted energy per resource element (EPRE) as compared to an EPRE of a CSI-RS transmitted in a CSI-RS occasion occurring in a non-SBFD set of symbols.

27 Claims, 7 Drawing Sheets

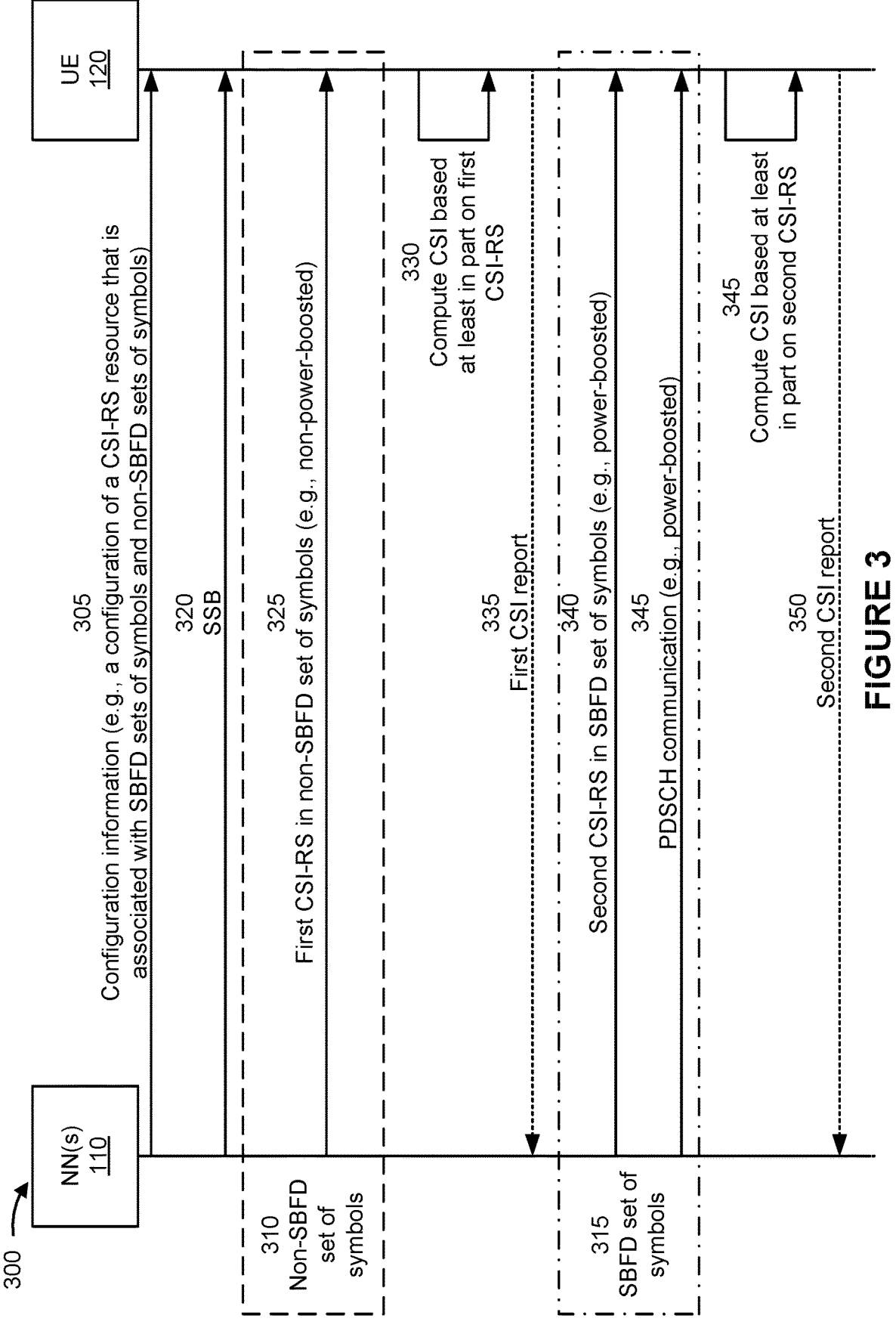

300

NN(s)
110

UE
120

305
Configuration information (e.g., a configuration of a CSI-RS resource that is associated with SBFD sets of symbols and non-SBFD sets of symbols)

320
SSB

310
Non-SBFD set of symbols

325
First CSI-RS in non-SBFD set of symbols (e.g., non-power-boosted)

330
Compute CSI based at least in part on first CSI-RS

335
First CSI report

315
SBFD set of symbols

340
Second CSI-RS in SBFD set of symbols (e.g., power-boosted)

345
PDSCH communication (e.g., power-boosted)

345
Compute CSI based at least in part on second CSI-RS

350
Second CSI report

FIGURE 3

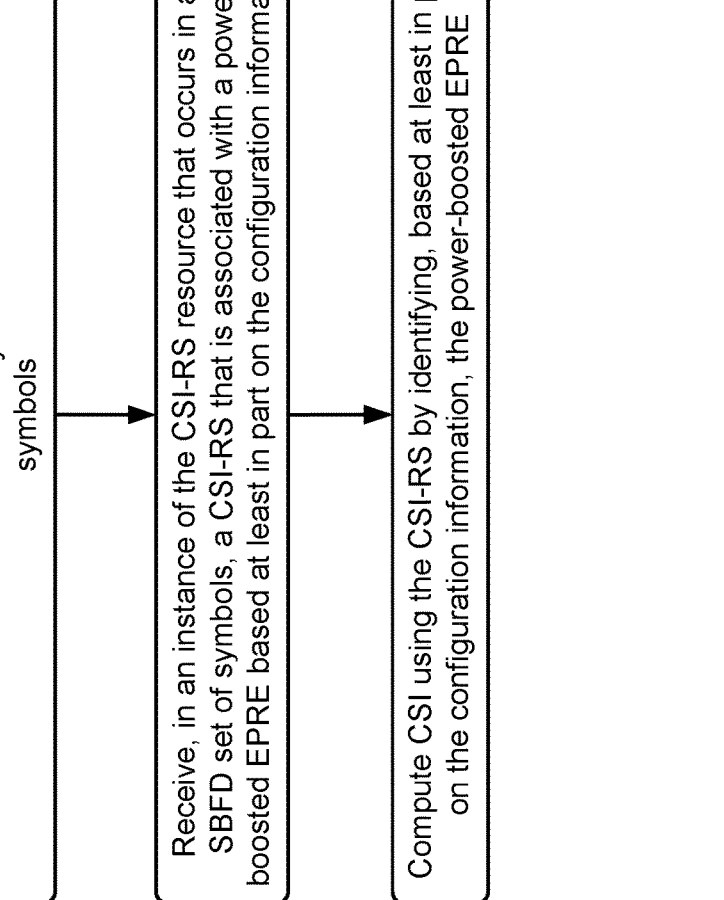

410 — Receive configuration information that configures a CSI-RS resource that is associated with SBFD sets of symbols and non-SBFD sets of symbols 420 — Receive, in an instance of the CSI-RS resource that occurs in an SBFD set of symbols, a CSI-RS that is associated with a power-boosted EPRE based at least in part on the configuration information 430 — Compute CSI using the CSI-RS by identifying, based at least in part on the configuration information, the power-boosted EPRE

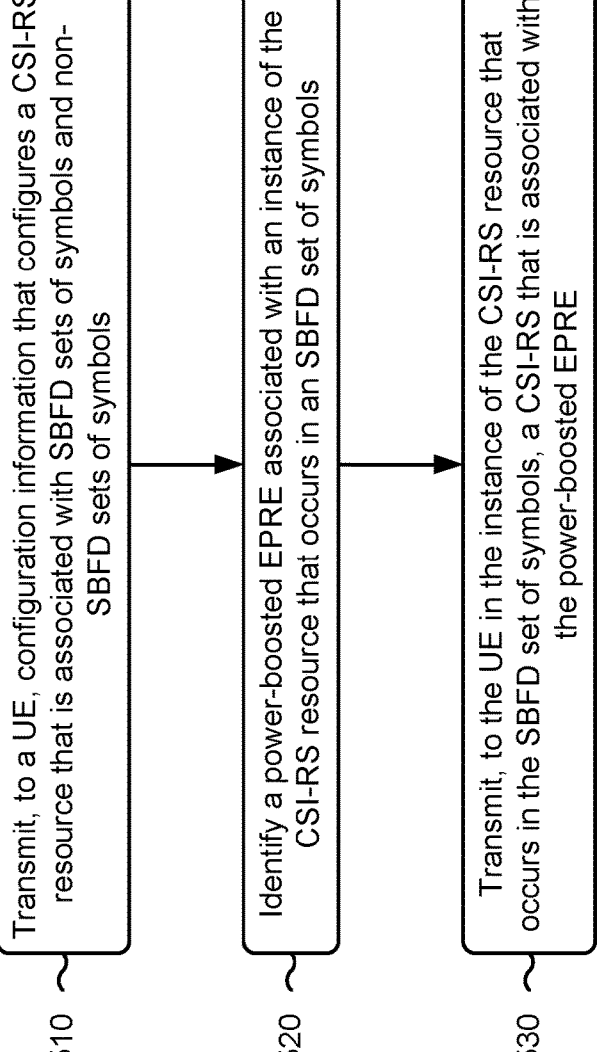

510 — Transmit, to a UE, configuration information that configures a CSI-RS resource that is associated with SBFD sets of symbols and non-SBFD sets of symbols 520 — Identify a power-boosted EPRE associated with an instance of the CSI-RS resource that occurs in an SBFD set of symbols 530 — Transmit, to the UE in the instance of the CSI-RS resource that occurs in the SBFD set of symbols, a CSI-RS that is associated with the power-boosted EPRE

POWER BOOSTING OF A CHANNEL STATE INFORMATION REFERENCE SIGNAL IN A SUB-BAND FULL DUPLEX SET OF SYMBOLS

FIELD OF THE DISCLOSURE

Aspects of the present disclosure generally relate to wireless communication and specifically, to techniques and apparatuses for power boosting of a channel state information reference signal in a sub-band full duplex set of symbols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, a UE may be configured with one or more channel state information (CSI) reference signal (CSI-RS) resources, such as via one or more CSI report settings, for performing channel measurements and/or computing CSI. In examples in which a single CSI-RS resource (for example, a periodic or semi-persistent CSI-RS resource) is configured for both sub-band (SBFD) sets of symbols and non-SBFD sets of symbols, the CSI-RS resource may have occasions in SBFD sets of symbols where CSI-RS resource elements (REs) are not transmitted by a network node, such as REs that overlap with an uplink sub-band and/or a guard band in the SBFD sets of symbols. Accordingly, if the CSI-RS is transmitted with a fixed energy per RE (EPRE), occasions of the CSI-RS transmitted in the SBFD sets of symbols may have lower per-symbol transmission power than occasions of the CSI-RS transmitted in the non-SBFD sets of symbols. Reducing a per-symbol transmission power of a CSI-RS transmitted in an SBFD set of symbols may result in improperly computed CSI and thus reduced channel quality, decreased throughput, increased latency, and increased communication errors.

SUMMARY

Some aspects described herein relate to a method of wireless communication performed at a user equipment (UE). The method may include receiving configuration information to configure a channel state information reference signal (CSI-RS) resource that is associated with sub-band full duplex (SBFD) sets of symbols and non-SBFD sets of symbols. The method may include receiving, in an instance of the CSI-RS resource that occurs in an SBFD set of symbols, a CSI-RS that is associated with a power-boosted energy per resource element (EPRE) based at least in part on the configuration information. The method may include computing channel state information using the CSI-RS by identifying, based at least in part on the configuration information, the power-boosted EPRE.

Some aspects described herein relate to a method of wireless communication performed at a network node. The method may include transmitting, to a UE, configuration information to configure a CSI-RS resource that is associated with SBFD sets of symbols and non-SBFD sets of symbols. The method may include identifying a power-boosted EPRE associated with an instance of the CSI-RS resource that occurs in an SBFD set of symbols. The method may include transmitting, to the UE in the instance of the CSI-RS resource that occurs in the SBFD set of symbols, a CSI-RS that is associated with the power-boosted EPRE.

Some aspects described herein relate to an apparatus for wireless communication at a UE. The apparatus may include one or more memories storing processor-executable code and one or more processors coupled with the one or more memories. At least one processor of the one or more processors may be configured to cause the UE to receive configuration information to configure a CSI-RS resource that is associated with SBFD sets of symbols and non-SBFD sets of symbols. At least one processor of the one or more processors may be configured to cause the UE to receive, in an instance of the CSI-RS resource that occurs in an SBFD set of symbols, a CSI-RS that is associated with a power-boosted EPRE based at least in part on the configuration information. At least one processor of the one or more processors may be configured to cause the UE to compute channel state information using the CSI-RS by identifying, based at least in part on the configuration information, the power-boosted EPRE.

Some aspects described herein relate to an apparatus for wireless communication at a network node. The apparatus may include one or more memories storing processor-executable code and one or more processors coupled with the one or more memories. At least one processor of the one or more processors may be configured to cause the network node to transmit, to a UE, configuration information to configure a CSI-RS resource that is associated with SBFD sets of symbols and non-SBFD sets of symbols. At least one processor of the one or more processors may be configured to cause the network node to identify a power-boosted EPRE associated with an instance of the CSI-RS resource that occurs in an SBFD set of symbols. At least one processor of the one or more processors may be configured to cause the network node to transmit, to the UE in the instance of the CSI-RS resource that occurs in the SBFD set of symbols, a CSI-RS that is associated with the power-boosted EPRE.

Some aspects described herein relate to a non-transitory computer-readable medium that stores one or more instructions for wireless communication. The one or more instructions, when executed by one or more processors of a UE, may cause the UE to receive configuration information to configure a CSI-RS resource that is associated with SBFD sets of symbols and non-SBFD sets of symbols. The one or more instructions, when executed by one or more processors of the UE, may cause the UE to receive, in an instance of the CSI-RS resource that occurs in an SBFD set of symbols, a CSI-RS that is associated with a power-boosted EPRE based at least in part on the configuration information. The one or more instructions, when executed by one or more processors of the UE, may cause the UE to compute channel state information using the CSI-RS by identifying, based at least in part on the configuration information, the power-boosted EPRE.

Some aspects described herein relate to a non-transitory computer-readable medium that stores one or more instructions for wireless communication. The one or more instructions, when executed by one or more processors of a network node, may cause the network node to transmit, to a UE, configuration information to configure a CSI-RS resource that is associated with SBFD sets of symbols and non-SBFD sets of symbols. The one or more instructions, when executed by one or more processors of a network node, may cause the network node to identify a power-boosted EPRE associated with an instance of the CSI-RS resource that occurs in an SBFD set of symbols. The one or more instructions, when executed by one or more processors of the network node, may cause the network node to transmit, to the UE in the instance of the CSI-RS resource that occurs in the SBFD set of symbols, a CSI-RS that is associated with the power-boosted EPRE.

Some aspects described herein relate to an apparatus for wireless communication. The apparatus may include means for receiving configuration information to configure a CSI-RS resource that is associated with SBFD sets of symbols and non-SBFD sets of symbols. The apparatus may include means for receiving, in an instance of the CSI-RS resource that occurs in an SBFD set of symbols, a CSI-RS that is associated with a power-boosted EPRE based at least in part on the configuration information. The apparatus may include means for computing channel state information using the CSI-RS by identifying, based at least in part on the configuration information, the power-boosted EPRE.

Some aspects described herein relate to an apparatus for wireless communication. The apparatus may include means for transmitting, to a UE, configuration information to configure a CSI-RS resource that is associated with SBFD sets of symbols and non-SBFD sets of symbols.

The apparatus may include means for identifying a power-boosted EPRE associated with an instance of the CSI-RS resource that occurs in an SBFD set of symbols. The apparatus may include means for transmitting, to the UE in the instance of the CSI-RS resource that occurs in the SBFD set of symbols, a CSI-RS that is associated with the power-boosted EPRE.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 3 is a diagram of an example associated with power boosting of a channel state information reference signal (CSI-RS) in a sub-band full duplex (SBFD) set of symbols.

FIG. 4 is a flowchart illustrating an example process performed, for example, at a UE or an apparatus of a UE that supports power boosting of a CSI-RS.

FIG. 5 is a flowchart illustrating an example process performed, for example, at a network node or an apparatus of a network node that supports power boosting of a CSI-RS.

DETAILED DESCRIPTION

Figure 1:
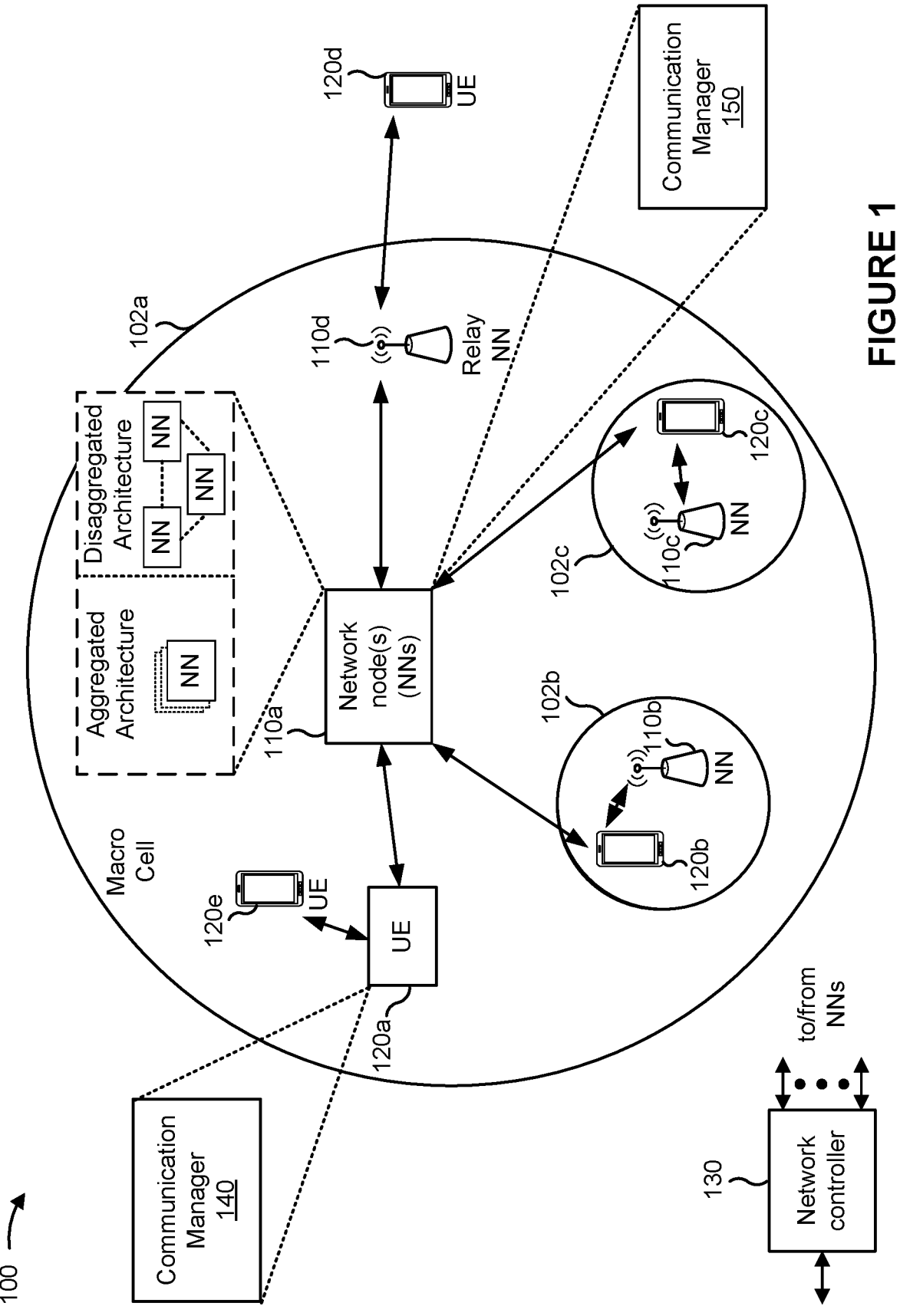
FIG. 1 is a diagram illustrating an example of a wireless network.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some examples, a user equipment (UE) may be configured with one or more channel state information (CSI) reference signal (CSI-RS) resources, such as via one or more CSI report settings, for performing channel measurements and/or computing CSI. In examples in which a single CSI-RS resource (for example, a periodic or semi-persistent CSI-RS resource) is configured for both sub-band full duplex (SBFD) sets of symbols and non-SBFD sets of symbols, the CSI-RS resource may have occasions in SBFD sets of symbols where CSI-RS resource elements (REs) are not transmitted by a network node, such as REs that overlap with an uplink sub-band and/or a guard band in the SBFD sets of symbols. Accordingly, if the CSI-RS is transmitted with a fixed energy per RE (EPRE), occasions of the CSI-RS transmitted in the SBFD sets of symbols may have lower per-symbol transmission power than occasions of the CSI-RS transmitted in the non-SBFD sets of symbols. Reducing a per-symbol transmission power of a CSI-RS transmitted in an SBFD set of symbols may result in improperly computed CSI and thus reduced channel quality, decreased throughput, increased latency, and increased communication errors.

Various aspects relate generally to power boosting a CSI-RS. Some aspects more specifically relate to power boosting a CSI-RS in a CSI-RS resource occasion occurring in an SBFD set of symbols and/or in a CSI-RS resource occasion that overlaps with an uplink sub-band of the SBFD set of symbols and/or a guard band of the SBFD set of symbols.

In some aspects, a network node may configure a UE with a CSI-RS resource associated with SBFD sets of symbols and non-SBFD sets of symbols. For example, the network node may configure the UE with a periodic or semi-persistent CSI-RS resource that has occasions in both SBFD sets of symbols and non-SBFD sets of symbols. The network node may transmit, and the UE may receive, in an instance of the CSI-RS resource that occurs in an SBFD set of symbols, a CSI-RS. The CSI-RS may be associated with a power-boosted EPRE as compared to an EPRE of a CSI-RS transmitted in a CSI-RS occasion occurring in a non-SBFD set of symbols, such that a same per-symbol CSI-RS transmit power may be maintained in the SBFD set of symbols and the non-SBFD set of symbols. In some aspects, a boosting factor associated with the power-boosted EPRE may be based at least in part on a bandwidth of overlapping CSI-RS resources and uplink and/or guard band resources in the SBFD set of symbols. In some other aspects, the boosting factor associated with the power-boosted EPRE may be selected (e.g., by the network node) from multiple specified candidate boosting factors and/or the selected boosting factor may be signaled to the UE by the network node.

In some aspects, the network node may configure the UE with the CSI-RS resource associated with SBFD sets of symbols and non-SBFD sets of symbols via radio resource control (RRC) signaling, such as by configuring the UE with a periodic CSI-RS resource, a semi-persistent CSI-RS resource, or an aperiodic resource. Additionally, or alternatively, the network node may activate and/or deactivate EPRE power boosting via the RRC signaling or else via dynamic signaling. For example, the network node may indicate activation and/or deactivation of EPRE power boosting using a field in a medium access control (MAC) control element (MAC-CE) and/or a dedicated MAC-CE related to EPRE power boosting.

In some aspects, an EPRE associated with a downlink communication (e.g., a physical downlink shared channel (PDSCH) communication) associated with the CSI-RS may be defined relative to the CSI-RS EPRE. For example, in aspects in which a same per-symbol transmit power associated with downlink communications is to be maintained in the SBFD set of symbols and the non-SBFD set of symbols, the UE may be configured to use a same power control offset value for both SBFD CSI computation and non-SBFD CSI computation. In some other aspects, such as in aspects in which a same EPRE associated with downlink communications is to be maintained in the SBFD set of symbols and the non-SBFD set of symbols, a UE may be configured to adjust a power control offset parameter, such that a different power control offset parameter is used in the SBFD set of symbols and the non-SBFD set of symbols.

Particular aspects of the subject matter described in this disclosure can be implemented to realize one or more of the following potential advantages.

In some aspects, by maintaining a same per-symbol CSI-RS power in the SBFD set of symbols and the non-SBFD set of symbols, communication errors associated with SBFD sets of symbols may be reduced, resulting in reduced power, computing, and network resource consumption that would otherwise be required to correct communication errors associated with the SBFD set of symbols. For example, by the network node transmitting, in an instance of the CSI-RS resource that occurs in the SBFD set of symbols, the CSI-RS associated with the power-boosted EPRE, a per-symbol transmit power across non-SBFD sets of symbols and SBFD sets of symbols may be maintained, thus improving reception of the CSI-RS at the UE and thus improving a quality of CSI computed from the CSI-RS.

In some aspects, by the network node configuring the UE with a single CSI-RS resource associated with both SBFD sets of symbols and non-SBFD sets of symbols, network overhead otherwise associated with multiple configurations (for example, multiple CSI report settings, with at least one for SBFD sets of symbols and at least one for non-SBFD sets of symbols) may be reduced, thereby improving network capacity, reducing network latency, increasing network throughput, and otherwise resulting in more efficient usage of network resources.

In some aspects, by activating and/or updating EPRE power boosting via dynamic signaling, the network node may experience flexibility as to whether CSI EPRE power boosting is to be utilized with respect to a given instance of a CSI-RS resource. For example, a network node may indicate, via dynamic signaling, that a CSI-RS to be transmitted in a first instance of the CSI-RS resource that occurs in the SBFD set of symbols will be EPRE power boosted, such as for a purpose of maintaining a same per-symbol CSI-RS power in the SBFD set of symbols and the non-SBFD set of symbols in order to improve CSI computation, and the network node may indicate, via dynamic signaling, that a CSI-RS associated with a second instance of the CSI-RS resource that occurs in the SBFD set of symbols will not be EPRE power boosted, such as for a purpose of maintaining a same EPRE in the SBFD set of symbols and the non-SBFD set of symbols and thus reducing power consumption associated with transmitting the CSI-RS in the SBFD set of symbols.

In some aspects, by defining an EPRE associated with a downlink communication (e.g., a PDSCH communication) relative to the CSI-RS EPRE, power consumption and/or communication errors associated with transmitting downlink communications may be reduced.

For example, by maintaining a same per-symbol transmit power associated with downlink communications in the SBFD set of symbols and the non-SBFD set of symbols, EPRE power boosting may be achieved for downlink communications in the SBFD set of symbols, resulting in reduced communication errors and thus reduced power, computing, and network consumption otherwise required for correcting communication errors associated with downlink communications. In some other aspects, by maintaining a same EPRE associated with downlink communications in the SBFD set of symbols and the non-SBFD set of symbols, power consumption associated with transmitting the downlink communications in the SBFD set of symbols may be reduced.

FIG. 1 is a diagram illustrating an example of a wireless network. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell (e.g., macro cell 102a), a pico cell (e.g., pico cell 102b), a femto cell (e.g., femto cell 102c), or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses (for example, an augmented reality (AR), virtual reality (VR), mixed reality, or extended reality (XR) headset), a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium. Some UEs 120 (for example, UEs 120*a* and 120*e*) may communicate directly using one or more sidelink channels (for example, without a network node as an intermediary to communicate with one another).

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol using, for example, a PC5 interface for direct communication, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110. In other examples, the two or more UEs 120 may communicate through a vehicle-to-network-to-vehicle (V2N2V) protocol, for example, by communicating through a Uu interface using the LTE and/or NR uplink and downlink.

In some aspects, the UE 120 may include a communication manager 140. As described in more detail elsewhere herein, the communication manager 140 may receive configuration information to configure a CSI-RS resource that is associated with SBFD sets of symbols and non-SBFD sets of symbols; receive, in an instance of the CSI-RS resource that occurs in an SBFD set of symbols, a CSI-RS that is associated with a power-boosted EPRE based at least in part on the configuration information; and computing CSI using the CSI-RS by identifying, based at least in part on the configuration information, the power-boosted EPRE. Additionally or alternatively, the communication manager 140 may perform one or more other operations described herein.

In some aspects, the network node 110 may include a communication manager 150. As described in more detail elsewhere herein, the communication manager 150 may transmit, to a UE, configuration information to configure a CSI-RS resource that is associated with SBFD sets of symbols and non-SBFD sets of symbols; identify a power-boosted EPRE associated with an instance of the CSI-RS resource that occurs in an SBFD set of symbols; and transmit, to the UE in the instance of the CSI-RS resource that occurs in the SBFD set of symbols, a CSI-RS that is associated with the power-boosted EPRE. Additionally or alternatively, the communication manager 150 may perform one or more other operations described herein.

Figure 2:
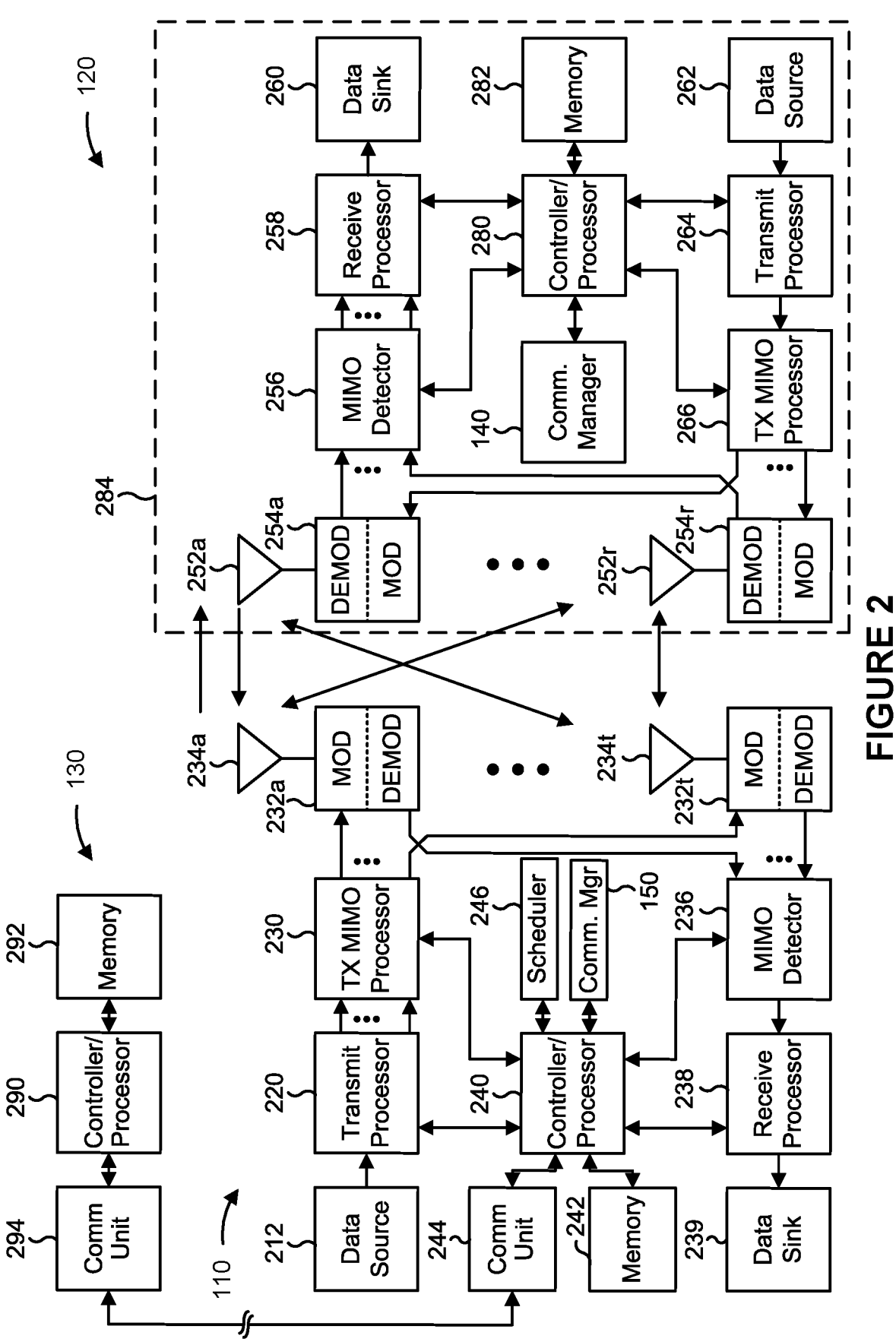
FIG. 2 is a diagram illustrating an example network node in communication with a user equipment (UE) in a wireless network.

FIG. 2 is a diagram illustrating an example network node in communication with a UE in a wireless network. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 (for example, one or more memories) to perform aspects of any of the methods described herein.

The controller/processor 240 of the network node 110, the controller/processor 280 of the UE 120, or any other component(s) of FIG. 2 may perform one or more techniques associated with power boosting of a CSI-RS in an SBFD set of symbols, as described in more detail elsewhere herein. For example, the controller/processor 240 of the network node 110, the controller/processor 280 of the UE 120, or any other component(s) of FIG. 2 may perform or direct operations of, for example, process 400 of FIG. 4, process 500 of FIG. 5, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 400 of FIG. 4, process 500 of FIG. 5, or other processes as described herein. In some examples, executing instructions may include running the instructions, converting the instructions, compiling the instructions, or interpreting the instructions, among other examples. In some implementations, one or more of the multiple memories may be configured to store processor-executable code that, when executed, may configure the one or more processors to perform various functions described herein (as part of a processing system). In some other implementations, the processing system may be pre-configured to perform various functions described herein.

In some aspects, an individual processor may perform all of the functions described as being performed by one or more processors. In some aspects, one or more processors may collectively perform (or be configured or operable to perform) a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

In some aspects, the UE 120 includes means for receiving configuration information to configure a CSI-RS resource that is associated with SBFD sets of symbols and non-SBFD sets of symbols; means for receiving, in an instance of the CSI-RS resource that occurs in an SBFD set of symbols, a CSI-RS that is associated with a power-boosted EPRE based at least in part on the configuration information; and/or means for computing CSI using the CSI-RS by identifying, based at least in part on the configuration information, the power-boosted EPRE. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information to configure a CSI-RS resource that is associated with SBFD sets of symbols and non-SBFD sets of symbols; means for identifying a power-boosted EPRE associated with an instance of the CSI-RS resource that occurs in an SBFD set of symbols; and/or means for transmitting, to the UE in the instance of the CSI-RS resource that occurs in the SBFD set of symbols, a CSI-RS that is associated with the power-boosted EPRE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some examples, a wireless communication device (for example, a UE 120, a network node 110, or a similar device) may operate in a full duplex (FD) communication mode and/or may be an FD wireless communication device, while, in some other examples, a wireless communication device may operate in a half duplex (HD) communication mode and/or may be an HD wireless communication device. FD communication in a wireless network refers to simultaneous bi-directional communication between devices in the wireless network. For example, a UE operating in an FD mode may transmit an uplink communication and receive a downlink communication at the same time (for example, in the same slot or the same symbol). HD communication in a wireless network refers to unidirectional communications (for example, only downlink communication or only uplink communication) between devices at a given time (for example, in a given slot or a given symbol).

In some examples, a wireless communication device operating in an FD mode may be operating in an in-band FD (IBFD) mode or an SBFD mode. In an IBFD mode, a wireless communication device may transmit and receive communications on the same time and frequency resources (for example, downlink (DL) resources and uplink (UL) resources may at least partially overlap in the time and frequency domains). In an SBFD mode, a wireless communication device may transmit and receive communications at the same time but on different frequency resources. In such examples, a DL resource (for example, a DL sub-band) may be separated from an UL resource (for example, an uplink sub-band) by a guard band.

In some examples, a CSI report setting may be used by a network node 110 to configure a UE 120 with multiple resources for performing certain measurements associated with a channel between the network node 110 and the UE 120 (for example, CSI). In some examples, such as examples involving SBFD-aware UEs, a UE 120 may be configured to report channel measurements associated with a non-SBFD set of symbols (for example, an HD set of symbols, such as an HD slot) as well as channel measurements associated with an SBFD set of symbols (for example, an FD set of symbols, such as an FD slot). In such examples, the UE 120 may be configured with multiple CSI report settings, with one of the CSI report settings and/or a corresponding CSI report associated with an SBFD set of symbols and with the other one of the CSI report settings and/or a corresponding CSI report associated with a non-SBFD set of symbols. Put another way, the UE 120 may be configured to perform separate CSI reporting for SBFD sets of symbols and non-SBFD sets of symbols. In such examples, the UE 120 may be configured with two CSI-RS resources, and thus each CSI report setting and/or CSI report may be associated with a corresponding CSI-RS for performing channel measurements. In some other examples, the UE may be configured with a single periodic or semi-persistent CSI-RS resource having occasions in both SBFD sets of symbols and non-SBFD sets of symbols, and thus each CSI report setting and/or CSI report may be associated with the same CSI-RS for performing channel measurements.

In some other examples, a UE 120 may be configured with a single CSI report setting, with the single CSI report setting and/or a corresponding CSI report associated with both an SBFD set of symbols (for example, SBFD channel measurements) and a non-SBFD set of symbols (for example, non-SBFD channel measurements). Put another way, the UE 120 may be configured to perform a same CSI reporting for SBFD sets of symbols and non-SBFD sets of symbols. In such examples, the UE may be configured with two CSI-RS resources (for example, one for SBFD sets of symbols and one for non-SBFD sets of symbols), and thus the single CSI report setting and/or CSI report may be associated with multiple CSI-RSs for performing channel measurements. In some other examples, the UE may be configured with a single periodic or semi-persistent CSI-RS resource having occasions in both SBFD sets of symbols and non-SBFD sets of symbols, and the single CSI report setting and/or CSI report may be associated with the same CSI-RS for performing channel measurements.

Additionally or alternatively, in some examples, a UE 120 may be configured with certain power control parameters that may be associated with a CSI report setting and/or a CSI-RS. For example, a UE 120 may be configured with a power control offset from a synchronization signal (SS) parameter (sometimes referred to as powerControlOffsetSS), which may correspond to a ratio of a non-zero power (NZP) CSI-RS EPRE to an SS/physical broadcast channel (PBCH) block EPRE. In some examples, the power control offset from the SS parameter (for example, powerControlOffsetSS) may have a configured value of one of −3 decibels (dB), 0 dB, 3 dB, or 6 dB. In such examples, a downlink CSI-RS EPRE parameter may be derived by the UE 120 from the SS/PBCH block downlink transmit power (for example, configured by an SS-PBCH-BlockPower parameter) based at least in part on the power control offset from the SS parameter (for example, powerControlOffsetSS), such as when the CSI-RS is quasi co-located (QCLed) with the SS/PBCH block and the SS/PBCH block can be associated with a serving cell physical channel identity (PCI) or an additional PCI different from the serving cell PCI.

Moreover, a UE 120 may be configured with a power control offset parameter (sometimes referred to as power-ControlOffset), which may correspond to a ratio of a PDSCH EPRE to an NZP CSI-RS EPRE. The power control offset parameter (for example, powerControlOffset) may have a configured value in a range of −8 dB to 15 dB, with a 1 dB step size (for example, the powerControlOffset may be configured as one of −8 dB, −7 dB, −6 dB, . . . , 13 dB, 14 dB, or 15 dB). Accordingly, a PDSCH EPRE may be derived by the UE 120 from the NZP CSI-RS EPRE based at least in part on the power control offset parameter. In some examples, a DMRS EPRE, such as a PDSCH-DMRS EPRE, may be defined relative to a PDSCH EPRE, such as by boosting the PDSCH-DMRS with respect to the PDSCH EPRE by a configured boosting factor of one of 0 dB, 3 dB, or 4.77 dB.

Accordingly, in examples in which a single CSI-RS resource (for example, a periodic or semi-persistent CSI-RS resource) is configured for both SBFD sets of symbols and non-SBFD sets of symbols, the CSI-RS resource may have occasions in SBFD sets of symbols where CSI-RS REs are not transmitted by a network node 110, such as REs that overlap with an uplink sub-band and/or a guard band in the SBFD sets of symbols. Accordingly, if the CSI-RS is transmitted with a fixed EPRE (for example, as indicated via the powerControlOffsetSS parameter), occasions of the CSI-RS transmitted in the SBFD sets of symbols may have lower per-symbol transmission power than occasions of the CSI-RS transmitted in the non-SBFD sets of symbols. For example, a signal to noise ratio (SNR) of the CSI-RS transmitted in the SBFD sets of symbols may be reduced by a factor of $10 \times \log_{10}(\text{CSIRS\_BW\_DL\_SBs/total\_C-}$ SIRS_BW), where CSIRS_BW_DL_SBs corresponds to the bandwidth of the portion of the downlink sub-band used to transmit CSI-RS, and total_CSIRS_BW corresponds to the total bandwidth of the CSI-RS. For example, if a CSI-RS has a total bandwidth of 100 MHz, but overlaps with an uplink and/or guard band of 30 MHz in an SBFD set of symbols, the CSI-RS occasions in the SBFD sets of symbols will be associated with an SNR reduction by a factor of $10 \times \log_{10}(70$ MHz/100 MHz), or −1.55 dB. Reducing a per-symbol transmission power and/or SNR of CSI-RSs transmitted in CSI-RS occasions occurring in SBFD sets of symbols may result in improperly computed CSI and thus reduced channel quality, resulting in decreased throughput, increased latency, and increased communication errors and thus increased power, computing, and network resource consumption associated with correcting communication errors.

Some aspects described herein enable power boosting of CSI-RS transmissions occurring in SBFD sets of symbols. For example, in some aspects, a UE may receive configuration information to configure the UE with a periodic or semi-persistent CSI-RS resource that has occasions in both SBFD sets of symbols and non-SBFD sets of symbols. In such aspects, the configuration information may configure the CSI-RS resource such that a CSI-RS transmitted in an SBFD set of symbols may be power boosted so an EPRE of the CSI-RS in the SBFD set of symbols is substantially the same as the EPRE of the CSI-RS in non-SBFD set of symbols. Put another way, the UE may receive, in an instance of the CSI-RS resource that occurs in the SBFD set of symbols, a CSI-RS that is associated with a power-boosted EPRE based at least in part on the configuration information. As a result, a per-symbol transmission power and/or an SNR of a CSI-RS transmitted in a CSI-RS resource occurring in an SBFD set of symbols may be the same as a per-symbol transmission power of a CSI-RS transmitted in a CSI-RS occasion occurring in a non-SBFD set of symbols, resulting in improved CSI and thus improved channel quality, increased throughput, decreased latency, and decreased communication errors and thus decreased power, computing, and network resource consumption otherwise associated with correcting communication errors.

FIG. 3 is a diagram of an example 300 associated with power boosting of a CSI-RS in an SBFD set of symbols. As shown in FIG. 3, a network node (for example, network node 110, a CU, a DU, and/or an RU) may communicate with a UE (for example, UE 120). In some aspects, the network node 110 and the UE 120 may be part of a wireless network (for example, wireless network 100). The UE 120 and the network node 110 may have established a wireless connection prior to operations shown in FIG. 3. In some aspects, the network node 110 may be capable of FD operation. Additionally or alternatively, the UE 120 may be an SBFD-aware UE (for example, a UE 120 that is aware that the network node 110 is capable of FD operation and/or that the network node 110 is communicating in SBFD sets of symbols).

As shown by reference number 305, the network node 110 may transmit, and the UE 120 may receive, configuration information. In some aspects, the UE 120 may receive the configuration information via one or more of system information (for example, a master information block (MIB) and/or a system information block (SIB), among other examples), RRC signaling, one or more MAC-CEs, and/or downlink control information (DCI), among other examples.

In some aspects, the configuration information may be related to, and/or transmitted in response to, a capability of the UE 120. For example, the UE 120 may transmit, and the network node 110 may receive, a capabilities report that indicates whether the UE 120 supports a feature and/or one or more parameters related to the feature. For example, the capability information may indicate a capability and/or parameter for SBFD operation. As another example, the capabilities report may indicate a capability and/or parameter for receiving a power-boosted CSI-RS, as described in more detail herein. One or more operations described herein may be based on capability information of the capabilities report. For example, the UE 120 may perform a communication in accordance with the capability information, or may receive configuration information that is in accordance with the capability information.

In some aspects, the configuration information and/or the capabilities report may include information transmitted via multiple communications. Additionally or alternatively, the network node 110 may transmit the configuration information, or a communication including at least a portion of the configuration information, before and/or after the UE 120 transmits the capabilities report. For example, the network node 110 may transmit a first portion of the configuration information before the capabilities report, the UE 120 may transmit at least a portion of the capabilities report, and network node 110 may transmit a second portion of the configuration information after receiving the capabilities report.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (for example, an indication described herein) may include a dynamic indication, such as one or more MAC-CEs and/or one or more DCI messages, among other examples.

In some aspects, the configuration information may configures a CSI-RS resource that is associated with a non-SBFD set of symbols 310 and an SBFD set of symbols 315. For example, the configuration information may configure the UE 120 with a periodic CSI-RS resource or a semi-persistent CSI-RS resource that has occasions occurring in both the non-SBFD set of symbols 310 and the SBFD set of symbols 315. In some aspects, the UE 120 may be configured with two CSI report settings, with each CSI report setting being associated with the same CSI-RS resource (for example, the same periodic or semi-persistent CSI-RS resource) for performing channel measurements. In some other aspects, the UE 120 may be configured with a single CSI report setting, and the single CSI report setting and/or CSI report may be associated with the same CSI-RS resource (for example, the same periodic or semi-persistent CSI-RS resource) for performing channel measurements.

Additionally or alternatively, the configuration information may include an indication that CSI-RS EPRE power boosting is to be enabled, such for occasions of the CSI-RS resource that occur in the SBFD sets of symbols 315. Put another way, because a CSI-RS that is transmitted in the SBFD set of symbols 315 may be rate-matched in order to avoid transmission in symbols associated with an uplink sub-band in the SBFD set of symbols 315 and/or a guard band in the SBFD set of symbols 315, the network node 110 may power boost a CSI-RS EPRE in the SBFD set of symbols 315, thereby maintaining a same SNR of the CSI-RS in the SBFD set of symbols 315 and the non-SBFD set of symbols 315.

In some aspects, an amount of CSI-RS EPRE boosting in the SBFD set of symbols 315 may be associated with a bandwidth of the CSI-RS resource that overlaps with an uplink sub-band and/or a guard band in the SBFD set of symbols 315. For example, a boosting factor associated with the CSI-RS in the SBFD set of symbols 315 may be equal to $-10 \times \log_{10}(\text{CSIRS\_BW\_DL\_SBs}/\text{total\_CSIRS\_BW})$. Thus, in the example in which a CSI-RS has a total bandwidth of 100 MHz, but overlaps with a 30 MHz uplink sub-band and/or guard band in the SBFD set of symbols 315, a boosting factor associated with the CSI-RS in the SBFD set of symbols 315 may be equal to $-10 \times \log 10(70 \text{ MHz}/100 \text{ MHz})$, or 1.55 dB.

In some aspects, the indication in the configuration information that CSI-RS EPRE power boosting is to be enabled may be associated with a parameter associated with an RRC configuration of an NZP CSI-RS resource, sometimes referred to as an NZP-CSI-RS-boosting parameter. In such aspects, NZP-CSI-RS-boosting parameter may be set to one of "enabled," in which CSI-RSs occurring in the SBFD set of symbols 315 will be power boosted (for example, an SNR of the CSI-RS will be maintained between the SBFD set of symbols 315 and the non-SBFD set of symbols 310), or "disabled," in which CSI-RSs occurring in the SBFD set of symbols 315 will not be power boosted (for example, an SNR of the CSI-RS will be lower in the SBFD set of symbols 315 than an SNR of the CSI-RS in the non-SBFD set of symbols 310).

In some other aspects, the configuration information may include an indication of a boosting factor associated with the power-boosted EPRE of the CSI-RS. For example, a wireless communication specification (for example, a specification promulgated by the 3GPP) may specify a list of allowed boosting factors to cover a range of typical rate-matched CSI-RS bandwidths in the SBFD set of symbols 315. For example, to cover rate-matched CSI-RS bandwidths of 0%, 5%, . . . , or 50%, among other examples, the specification may specify allowed boosting factors of $-10 \times \log 10(0)$, $-10 \times \log 10(0.05)$, . . . , or $-10 \times \log 10(0.50)$ (for example, 0 dB, 0.22 dB, . . . , or 3 dB). In such aspects, the configuration information (for example, an RRC configuration message) may indicated a selected one of the allowed boosting factors. For example, the NZP-CSI-RS-boosting parameter may be set to one of 0 dB, 0.22 dB, . . . , or 3 dB.

In some aspects, the CSI-RS EPRE boosting may be configured, enabled, and/or activated using RRC signaling, one or more MAC-CEs, or DCI, among other examples. For example, in aspects in which the CSI-RS resource is associated with a periodic CSI-RS resource, CSI-RS EPRE boosting may be enabled using RRC signaling. In aspects in which the CSI-RS resource is associated with a semi-persistent CSI-RS resource, CSI-RS EPRE boosting may be enabled using RRC signaling and/or an activating MAC-CE. In aspects in which an activating MAC-CE is used, the MAC-CE may include a field that indicates activation and/or deactivation of CSI-RS EPRE boosting. Additionally or alternatively, a specific type of MAC-CE may be used to enable the CSI-RS EPRE boosting. For example, a type of MAC-CE may be defined that is associated with EPRE boosting activation and/or deactivation for active periodic and/or semi-persistent CSI-RS resources. Moreover, in aspects in which the CSI-RS resource is associated with an aperiodic CSI-RS resource, CSI-RS EPRE boosting may be enabled using RRC signaling and/or a DCI communication.

For example, an indication that CSI-RS EPRE power boosting is to be enabled and/or activated may be included in a trigger state definition in addition to a QCL-Type D indication.

In some aspects, the configuration information may further configure a power control offset associated with a PDSCH to be received in the SBFD set of symbols 315. For example, in some aspects the configuration information may configure a power control offset parameter such that a same PDSCH per-symbol power is achieved in both the SBFD set of symbols 315 and the non-SBFD set of symbols 310. For example, the configuration information may indicate a single power control offset parameter (for example, a single powerControlOffset) associated with identifying an EPRE of PDSCH communications in the SBFD sets of symbols 315 and the non-SBFD sets of symbols 310. In such aspects, using the same power control offset parameter (for example, a same powerControlOffset) in the SBFD set of symbols 315 and the non-SBFD set of symbols 310 may result in power-boosted PDSCH communications in the SBFD set of symbols 315, because the power control offset parameter may be applied relative to a power-boosted CSI-RS EPRE in the SBFD set of symbols, which is described in more detail below in connection with reference number 345.

In some other aspects, the configuration information may configure multiple power control offset parameters such that a same PDSCH EPRE (and thus PDSCH-DMRS EPRE) is achieved in both the SBFD set of symbols 315 and the non-SBFD set of symbols 310. For example, the configuration information may indicate a first power control offset parameter (for example, a first powerControlOffset) associated with identifying an EPRE of PDSCH communications in the SBFD sets of symbols 315 and a second power control offset parameter (for example, a second powerControlOffset) associated with identifying the EPRE of the PDSCH communications in the non-SBFD sets of symbols 310. In some aspects, the configuration information may configure the multiple power control offset parameters such that a same PDSCH EPRE (and thus PDSCH-DMRS EPRE) is achieved in both the SBFD set of symbols 315 and the non-SBFD set of symbols 310 when the network node 110 has already taken into account rate-matched resources by considering an SBFD specific CSI-RS resource where only REs in downlink sub-bands are assumed to be available when computing CSI.

The UE 120 may configure itself based at least in part on the configuration information. In some aspects, the UE 120 may be configured to perform one or more operations described herein based at least in part on the configuration information.

As shown by reference number 320, in some aspects the network node 110 may transmit, and the UE 120 may receive, an SS block (SSB) (sometimes referred to as an SS/PBCH block). In some aspects, the configuration information described above in connection with reference number 305 may indicate certain parameters associated with the SSB. For example, the configuration information may indicate an SSB power parameter (for example, SS-PBCH-BlockPower) associated with a transmit power of the SSB. In this regard, the UE 120 may be capable of deriving a transmit power associated with a CSI-RS, such as via a known ratio of transmit power of the CSI-RS to the transmit power of the SSB (for example, indicated by powerControlOffsetSS) and/or any power boosting factor associated with the CSI-RS, as described herein.

As shown by reference number 325, the network node 110 may transmit, and the UE 120 may receive, a first instance of a CSI-RS in a CSI-RS resource occasion occurring the non-SBFD set of symbols 310. In this regard, the CSI-RS may be associated with a non-power boosted EPRE because the CSI-RS may not be rate matched around any uplink sub-bands and/or guard bands. Put another way, a ratio of a transmit power associated with a CSI-RS transmitted in a CSI-RS resource occasion associated with non-SBFD slots to a ratio of a transmit power associated with the SSB may be fixed according to the power control offset from the SS parameter (for example, the powerControlOffsetSS parameter). In that regard, and as indicated by reference number 330, the UE 120 may compute CSI based at least in part on the first CSI-RS resource occasion (for example, based at least in part on the non-power-boosted CSI-RS received in the first CSI-RS resource occasion).

Additionally, in some aspects, the UE 120 may transmit, and the network node 110 may receive, a first CSI report that reports CSI associated with the first CSI-RS resource occasion, as indicated by reference number 335. In some aspects, the first CSI report shown in connection with reference number 335 may be omitted. For example, in aspects in which the configuration information configures the UE 120 with a single CSI report setting and/or otherwise configures a single CSI report for reporting both non-SBFD measurements and SBFD measurements, the first CSI report may be omitted and the UE 120 may instead transmit a single CSI report that includes both non-SBFD measurements and SBFD measurements, which is described in more detail below in connection with reference number 350.

As indicated by reference number 340, the network node 110 may transmit, and the UE 120 may receive, a second instance of a CSI-RS in a CSI-RS resource occasion occurring in the SBFD set of symbols 315. Because the CSI-RS may be transmitted in resources that overlap with an uplink sub-band and/or a guard band in the SBFD set of symbols 315, the CSI-RS may be rate matched to avoid the uplink sub-band and/or the guard band (for example, such that only a portion of the CSI-RS resource that overlaps with a downlink sub-band in the SBFD set of symbols 315 is used to transmit the CSI-RS). In that regard, if an EPRE associated with the CSI-RS transmitted in the SBFD set of symbols 315 is the same as an EPRE associated with the CSI-RS transmitted in the non-SBFD set of symbols, the CSI-RS transmitted in the SBFD set of symbols 315 is associated with a lower per-symbol transmission power than the CSI-RS transmitted in the non-SBFD set of symbols 310 (for example, by a factor of $10 \times \log_{10}(\text{CSIRS\_BW\_DL\_SBs}/\text{total\_CSIRS\_BW})$, as described above), which may lead to inaccurately computed CSI. In this regard, the CSI-RS may be associated with a power boosted EPRE in order to maintain a per-symbol transmission power of the CSI-RS in the SBFD set of symbols 315 as compared to the non-SBFD set of symbols. In that regard, the network node 110 may identify a power-boosted EPRE associated with the CSI-RS resource that occurs in the SBFD set of symbols 315, such that, for example, a per-symbol transmit power associated with the instance of the SBFD resource that occurs in the SBFD set of symbols 315 is a same per-symbol transmit power as a per-symbol transmit power associated with an instance of the CSI-RS resource that occurs in the non-SBFD set of symbols 310. Moreover, the network node 110 may transmit, and the UE 120 may receive, in an instance of the CSI-RS resource that occurs in the SBFD set of symbols 315, a CSI-RS that is associated with a power-boosted EPRE based at least in part on the configuration information (for example, based at least in part on the network node 110 enabling power-boosting of the CSI-RS EPRE via the configuration information described above in connection with reference number 305, based at least in part on a boosting factor indicated by the configuration information, and/or based at least in part on similar configuration information).

Moreover, as described above in connection with reference number 305, in some aspects the UE 120 may be configured to compute or otherwise determine a boosting factor associated with the CSI-RS based at least in part on a bandwidth of the CSI-RS resource that overlaps with an uplink sub-band and/or a guard band of the SBFD set of symbols 315. For example, in some aspects, a boosting factor associated with the power-boosted EPRE may be related to a bandwidth of the instance of the CSI-RS resource that overlaps with at least one of an uplink sub-band of the SBFD set of symbols 315 or a guard band of the SBFD set of symbols 310, such as according to the expression to $-10 \times \log_{10}(\text{CSIRS\_BW\_DL\_SBs/total\_CSIRS\_BW})$. In some other aspects, the UE 120 may be expressly configured with a boosting factor associated with the CSI-RS. For example, as described above in connection with reference number 305, in some aspects the UE 120 may be expressly configured with a boosting factor parameter (for example, NZP-CSI-RS-boosting), which may be set to one of 0 dB, 0.22 dB, . . . , or 3 dB, corresponding to rate-matched CSI-RS bandwidths of 0%, 5%, . . . , or 50%, among other examples.

As indicated by reference number 345, the network node 110 may additionally transmit, and the UE 120 may additionally receive, a PDSCH communication in the SBFD set of symbols 315. In some aspects, the PDSCH communication may be power-boosted as compared to PDSCH communications transmitted in non-SBFD sets of symbols (for example, the non-SBFD set of symbols 310), such as for a purpose of maintaining a same per-symbol transmit power of PDSCH communications transmitted in SBFD sets of symbols and non-SBFD sets of symbols. More particularly, as shown by reference number 345, the network node 110 may transmit, and the UE 120 may receive, in the SBFD set of symbols 315, a PDSCH communication that is associated with a power-boosted EPRE. In some aspects, the power-boosted PDSCH communication may be based at least in part on a same power control offset parameter (for example, a same powerControlOffset parameter) as PDSCH communications transmitted in non-SBFD sets of symbols. In such aspects, because the CSI-RS transmitted in the SBFD set of symbols 315 may be power-boosted, the UE 120 may determine a transmit power of the PDSCH communication using the power control offset parameter relative to the power-boosted CSI-RS, resulting in a power-boosted PDSCH communication. Put another way, using a non-power-boosted CSI-RS EPRE in the non-SBFD sets of symbols 310 and a power-boosted CSI-RS EPRE in the SBFD set of symbols 315 together with a fixed power control offset parameter for both the non-SBFD set of symbols 310 and the SBFD set of symbols 315 will result in a non-power boosted PDSCH communication in the non-SBFD set of symbols 310 and a power-boosted PDSCH communication in the SBFD set of symbols 315.

In some other aspects, the PDSCH communication may not be power-boosted as compared to PDSCH communications transmitted in non-SBFD sets of symbols (for example, the non-SBFD set of symbols 310), such as for a purpose of maintaining a same PDSCH EPRE in SBFD sets of symbols and non-SBFD sets of symbols. In such aspects, the UE 120 may be configured to adjust a configured power control offset parameter (for example, powerControlOffset) when computing an EPRE associated with the PDSCH communication shown in connection with reference number 345. More particularly, in some aspects, the UE 120 may adjust the power control offset parameter to account for the power-boosted EPRE associated with the CSI-RS, resulting in an adjusted power control offset parameter, and/or the network node 110 may transmit, and the UE 120 may receive, in the SBFD set of symbols 315, a PDSCH communication based at least in part on the adjusted power control offset parameter. In some aspects, the UE 120 may be configured to adjust the power control offset parameter when computing an EPRE associated with the SBFD set of symbols 315 in cases in which the network (for example, the network node 110) may already have taken into account rate-matched resources by considering an SBFD-specific CSI-RS resource where only REs in the downlink sub-bands that are used to transmit the CSI-RS are assumed to be available for computing CSI.

Additionally or alternatively, in aspects in which the configuration information indicates a first power control offset parameter (for example, a first powerControlOffset) associated with identifying an EPRE of PDSCH communications in the SBFD sets of symbols 315 and a second power control offset parameter (for example, a second powerControlOffset) associated with identifying an EPRE of PDSCH communications in the non-SBFD sets of symbols 310, the UE 120 may receive the PDSCH communication in the SBFD set of symbols 315 based at least in part on the first power control offset parameter. More particularly, based at least in part on receiving the PDSCH communication in the SBFD set of symbols 315, the UE 120 may compute an EPRE of the PDSCH communications using the first power control offset parameter.

As indicated by reference number 345, the UE 120 may compute CSI based at least in part on the second CSI-RS resource occasion (for example, based at least in part on the power-boosted CSI-RS received in the second CSI-RS resource occasion). For example, the UE 120 may compute CSI using the power-boosted CSI-RS received in the second CSI-RS resource occasion by identifying the power-boosted EPRE associated with the CSI-RS and/or using the identified power-boosted EPRE for computing the CSI. Additionally, in some aspects, the UE 120 may transmit, and the network node 110 may receive, a second CSI report that reports CSI associated with the second CSI-RS resource occasion (for example, SBFD measurements), as indicated by reference number 350. In some aspects, the second CSI report shown in connection with reference number 350 may only report CSI associated with the SBFD set of symbols 315, such as when the configuration information configures the UE 120 with two CSI report settings, one for reporting SBFD CSI and one for reporting non-SBFD CSI. In some other aspects, the second CSI report shown in connection with reference number 350 may include CSI associated with both the non-SBFD set of symbols 310 and the SBFD set of symbols 315, such as when the configuration information configures the UE 120 with a single CSI report setting for reporting both non-SBFD CSI and SBFD CSI.

Based at least in part on the network node 110 transmitting, and the UE 120 receiving, a CSI-RS associated with a power-boosted EPRE in the SBFD set of symbols 315, the UE 120 and/or the network node 110 may conserve computing, power, network, and/or communication resources that may have otherwise been consumed computing CSI in connection with a non-power-boosted CSI-RS. For example, based at least in part on the network node 110 transmitting, and the UE 120 receiving, a CSI-RS associated with a power-boosted EPRE in the SBFD set of symbols 315, the UE 120 may be capable of computing and reporting more accurate CSI, resulting in the UE 120 and the network node 110 communicating with a reduced error rate, which may conserve computing, power, network, and/or communication resources that may have otherwise been consumed to detect and/or correct communication errors.

As indicated above, FIG. 3 is provided as an example. Other examples may differ from what is described with respect to FIG. 3.

FIG. 4 is a flowchart illustrating an example process 400 performed, for example, at a UE or an apparatus of a UE that supports power boosting of a CSI-RS. Example process 400 is an example where the apparatus or the UE (for example, UE 120) performs operations associated with power boosting of a CSI-RS in an SBFD set of symbols.

As shown in FIG. 4, in some aspects, process 400 may include receiving configuration information to configure a CSI-RS resource that is associated with SBFD sets of symbols and non-SBFD sets of symbols (block 410). For example, the UE (such as by using communication manager 140 or reception component 602, depicted in FIG. 6) may receive configuration information to configure a CSI-RS resource that is associated with SBFD sets of symbols and non-SBFD sets of symbols, as described above.

As further shown in FIG. 4, in some aspects, process 400 may include receiving, in an instance of the CSI-RS resource that occurs in an SBFD set of symbols, a CSI-RS that is associated with a power-boosted EPRE based at least in part on the configuration information (block 420). For example, the UE (such as by using communication manager 140 or reception component 602, depicted in FIG. 6) may receive, in an instance of the CSI-RS resource that occurs in an SBFD set of symbols, a CSI-RS that is associated with a power-boosted EPRE based at least in part on the configuration information, as described above.

As further shown in FIG. 4, in some aspects, process 400 may include computing CSI using the CSI-RS by identifying, based at least in part on the configuration information, the power-boosted EPRE (block 430). For example, the UE (such as by using communication manager 140 or EPRE computation component 608, depicted in FIG. 6) may compute CSI using the CSI-RS by identifying, based at least in part on the configuration information, the power-boosted EPRE, as described above.

Process 400 may include additional aspects, such as any single aspect or any combination of aspects described below or in connection with one or more other processes described elsewhere herein.

In a first additional aspect, a boosting factor associated with the power-boosted EPRE is related to a bandwidth of the instance of the CSI-RS resource that overlaps with at least one of an uplink sub-band of the SBFD set of symbols or a guard band of the SBFD set of symbols.

In a second additional aspect, alone or in combination with the first aspect, the configuration information includes an indication that CSI-RS EPRE power boosting is to be enabled.

In a third additional aspect, alone or in combination with one or more of the first and second aspects, the configuration information includes an indication of a boosting factor associated with the power-boosted EPRE.

In a fourth additional aspect, alone or in combination with one or more of the first through third aspects, the CSI-RS resource is associated with one of a periodic CSI-RS resource or a semi-persistent CSI-RS resource, and at least one of: the configuration information includes an indication that CSI-RS EPRE power boosting is to be enabled, or the process 400 further comprises receiving a MAC-CE activating the CSI-RS EPRE power boosting.

In a fifth additional aspect, alone or in combination with one or more of the first through fourth aspects, the CSI-RS resource is associated with an aperiodic CSI-RS resource, and at least one of: the configuration information includes an indication that CSI-RS EPRE power boosting is to be enabled, or the process 400 further comprises receiving a downlink control information communication activating the CSI-RS EPRE power boosting.

In a sixth additional aspect, alone or in combination with one or more of the first through fifth aspects, the configuration information indicates a power control offset parameter associated with identifying an EPRE of PDSCH communications in the SBFD sets of symbols and the non-SBFD sets of symbols, and the process 400 further comprises receiving, in the SBFD set of symbols, a PDSCH communication that is associated with a power-boosted EPRE based at least in part on the power control offset parameter.

In a seventh additional aspect, alone or in combination with one or more of the first through sixth aspects, the configuration information indicates a power control offset parameter associated with identifying an EPRE of PDSCH communications in the SBFD sets of symbols and the non-SBFD sets of symbols, and the process 400 further comprises adjusting the power control offset parameter to account for the power-boosted EPRE associated with the CSI-RS, resulting in an adjusted power control offset parameter, and receiving, in the SBFD set of symbols, a PDSCH communication based at least in part on the adjusted power control offset parameter.

In an eighth additional aspect, alone or in combination with one or more of the first through seventh aspects, the configuration information indicates a first power control offset parameter associated with identifying an EPRE of PDSCH communications in the SBFD sets of symbols and a second power control offset parameter associated with identifying the EPRE of the PDSCH communications in the non-SBFD sets of symbols, and wherein the process 400 further comprises receiving, in the SBFD set of symbols, a PDSCH communication based at least in part on the first power control offset parameter.

Although FIG. 4 shows example blocks of process 400, in some aspects, process 400 may include additional blocks, fewer blocks, different blocks, or differently arranged blocks than those depicted in FIG. 4. Additionally or alternatively, two or more of the blocks of process 400 may be performed in parallel.

FIG. 5 is a flowchart illustrating an example process 500 performed, for example, at a network node or an apparatus of a network node that supports power boosting of a CSI-RS. Example process 500 is an example where the apparatus or the network node (for example, network node 110) performs operations associated with power boosting of a CSI-RS in an SBFD set of symbols.

As shown in FIG. 5, in some aspects, process 500 may include transmitting, to a UE, configuration information to configure a CSI-RS resource that is associated with SBFD sets of symbols and non-SBFD sets of symbols (block 510). For example, the network node (such as by using communication manager 150 or transmission component 704, depicted in FIG. 7) may transmit, to a UE, configuration information to configure a CSI-RS resource that is associated with SBFD sets of symbols and non-SBFD sets of symbols, as described above.

As further shown in FIG. 5, in some aspects, process 500 may include identifying a power-boosted EPRE associated with an instance of the CSI-RS resource that occurs in an SBFD set of symbols (block 520). For example, the network node (such as by using communication manager 150 or transmit power component 710, depicted in FIG. 7) may identify a power-boosted EPRE associated with an instance of the CSI-RS resource that occurs in an SBFD set of symbols, as described above.

As further shown in FIG. 5, in some aspects, process 500 may include transmitting, to the UE in the instance of the CSI-RS resource that occurs in the SBFD set of symbols, a CSI-RS that is associated with the power-boosted EPRE (block 530). For example, the network node (such as by using communication manager 150 or transmission component 704, depicted in FIG. 7) may transmit, to the UE in the instance of the CSI-RS resource that occurs in the SBFD set of symbols, a CSI-RS that is associated with the power-boosted EPRE, as described above.

Process 500 may include additional aspects, such as any single aspect or any combination of aspects described below or in connection with one or more other processes described elsewhere herein.

In a first additional aspect, a boosting factor associated with the power-boosted EPRE is related to a bandwidth of the instance of the CSI-RS resource that overlaps with at least one of an uplink sub-band of the SBFD set of symbols or a guard band of the SBFD set of symbols.

In a second additional aspect, alone or in combination with the first aspect, the configuration information includes an indication that CSI-RS EPRE power boosting is to be enabled.

In a third additional aspect, alone or in combination with one or more of the first and second aspects, the configuration information includes an indication of a boosting factor associated with the power-boosted EPRE.

In a fourth additional aspect, alone or in combination with one or more of the first through third aspects, the CSI-RS resource is associated with one of a periodic CSI-RS resource or a semi-persistent CSI-RS resource, and at least one of: the configuration information includes an indication that CSI-RS EPRE power boosting is to be enabled, or the process 500 further comprises transmitting, to the UE, a MAC-CE activating the CSI-RS EPRE power boosting.

In a fifth additional aspect, alone or in combination with one or more of the first through fourth aspects, the CSI-RS resource is associated with an aperiodic CSI-RS resource, and at least one of: the configuration information includes an indication that CSI-RS EPRE power boosting is to be enabled, or the process 500 further comprises transmitting, to the UE, a downlink control information communication activating the CSI-RS EPRE power boosting.

In a sixth additional aspect, alone or in combination with one or more of the first through fifth aspects, the configuration information indicates a power control offset parameter associated with the UE identifying an EPRE of PDSCH communications in the SBFD sets of symbols and the non-SBFD sets of symbols, and the process 500 further comprises transmitting, to the UE in the SBFD set of symbols, a PDSCH communication that is associated with a power-boosted EPRE based at least in part on the power control offset parameter.

In a seventh additional aspect, alone or in combination with one or more of the first through sixth aspects, the configuration information indicates a power control offset parameter associated with the UE identifying an EPRE of PDSCH communications in the SBFD sets of symbols and the non-SBFD sets of symbols, and the process 500 further comprises transmitting, to the UE in the SBFD set of symbols, a PDSCH communication based at least in part on an adjusted power control offset parameter that accounts for the power-boosted EPRE associated with the CSI-RS.

In an eighth additional aspect, alone or in combination with one or more of the first through seventh aspects, the configuration information indicates a first power control offset parameter associated with identifying an EPRE of PDSCH communications in the SBFD sets of symbols and a second power control offset parameter associated with identifying the EPRE of the PDSCH communications in the non-SBFD sets of symbols, and the process 500 further comprises transmitting, to the UE in the SBFD set of symbols, a PDSCH communication based at least in part on the first power control offset parameter.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
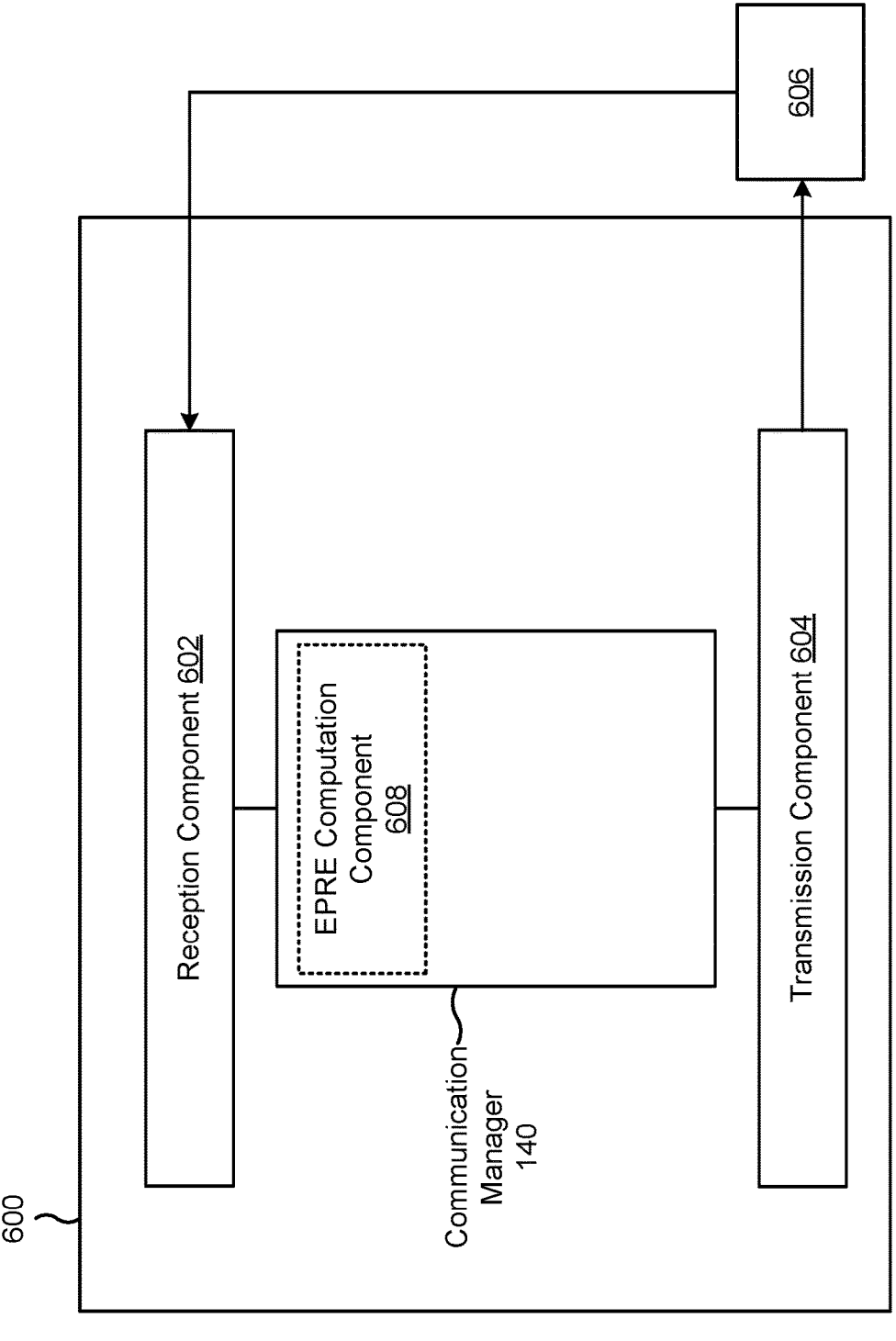
FIG. 6 is a diagram of an example apparatus for wireless communication that supports power boosting of a CSI-RS.

FIG. 6 is a diagram of an example apparatus 600 for wireless communication that supports power boosting of a CSI-RS. The apparatus 600 may be a UE, or a UE may include the apparatus 600. In some aspects, the apparatus 600 includes a reception component 602, a transmission component 604, and a communication manager 140, which may be in communication with one another (for example, via one or more buses). As shown, the apparatus 600 may communicate with another apparatus 606 (such as a UE, a network node, or another wireless communication device) using the reception component 602 and the transmission component 604.

In some aspects, the apparatus 600 may be configured to and/or operable to perform one or more operations described herein in connection with FIG. 3. Additionally or alternatively, the apparatus 600 may be configured to and/or operable to perform one or more processes described herein, such as process 400 of FIG. 5. In some aspects, the apparatus 600 may include one or more components of the UE 120 described above in connection with FIG. 2.

The reception component 602 may receive communications, such as reference signals, control information, and/or data communications, from the apparatus 606. The reception component 602 may provide received communications to one or more other components of the apparatus 600, such as the communication manager 140. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, one or more modems, one or more demodulators, one or more MIMO detectors, one or more receive processors, one or more controllers/processors, and/or one or more memories of the UE described above in connection with FIG. 2.

The transmission component 604 may transmit communications, such as reference signals, control information, and/or data communications, to the apparatus 606. In some aspects, the communication manager 140 may generate communications and may transmit the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 604 may be co-located with the reception component 602 in one or more transceivers.

The communication manager 140 may receive or may cause the reception component 602 to receive configuration information to configure a CSI-RS resource that is associated with SBFD sets of symbols and non-SBFD sets of symbols. The communication manager 140 and/or the EPRE computation component 608 may receive or may cause the reception component 602 to receive, in an instance of the CSI-RS resource that occurs in an SBFD set of symbols, a CSI-RS that is associated with a power-boosted EPRE based at least in part on the configuration information. The communication manager 140 and/or the EPRE computation component 608 may compute CSI using the CSI-RS by identifying, based at least in part on the configuration information, the power-boosted EPRE. In some aspects, the communication manager 140 may perform one or more operations described elsewhere herein as being performed by one or more components of the communication manager 140.

The communication manager 140 may include one or more controllers/processors and/or one or more memories of the UE 120 described above in connection with FIG. 2. In some aspects, the communication manager 140 includes a set of components, such as an EPRE computation component 608. Alternatively, the set of components may be separate and distinct from the communication manager 140. In some aspects, one or more components of the set of components may include or may be implemented within one or more controllers/processors and/or one or more memories of the UE 120 described above in connection with FIG. 2.

Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 602 may receive configuration information to configure a CSI-RS resource that is associated with SBFD sets of symbols and non-SBFD sets of symbols. The reception component 602 and/or the EPRE computation component 608 may receive, in an instance of the CSI-RS resource that occurs in an SBFD set of symbols, a CSI-RS that is associated with a power-boosted EPRE based at least in part on the configuration information. The EPRE computation component 608 may compute CSI using the CSI-RS by identifying, based at least in part on the configuration information, the power-boosted EPRE.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
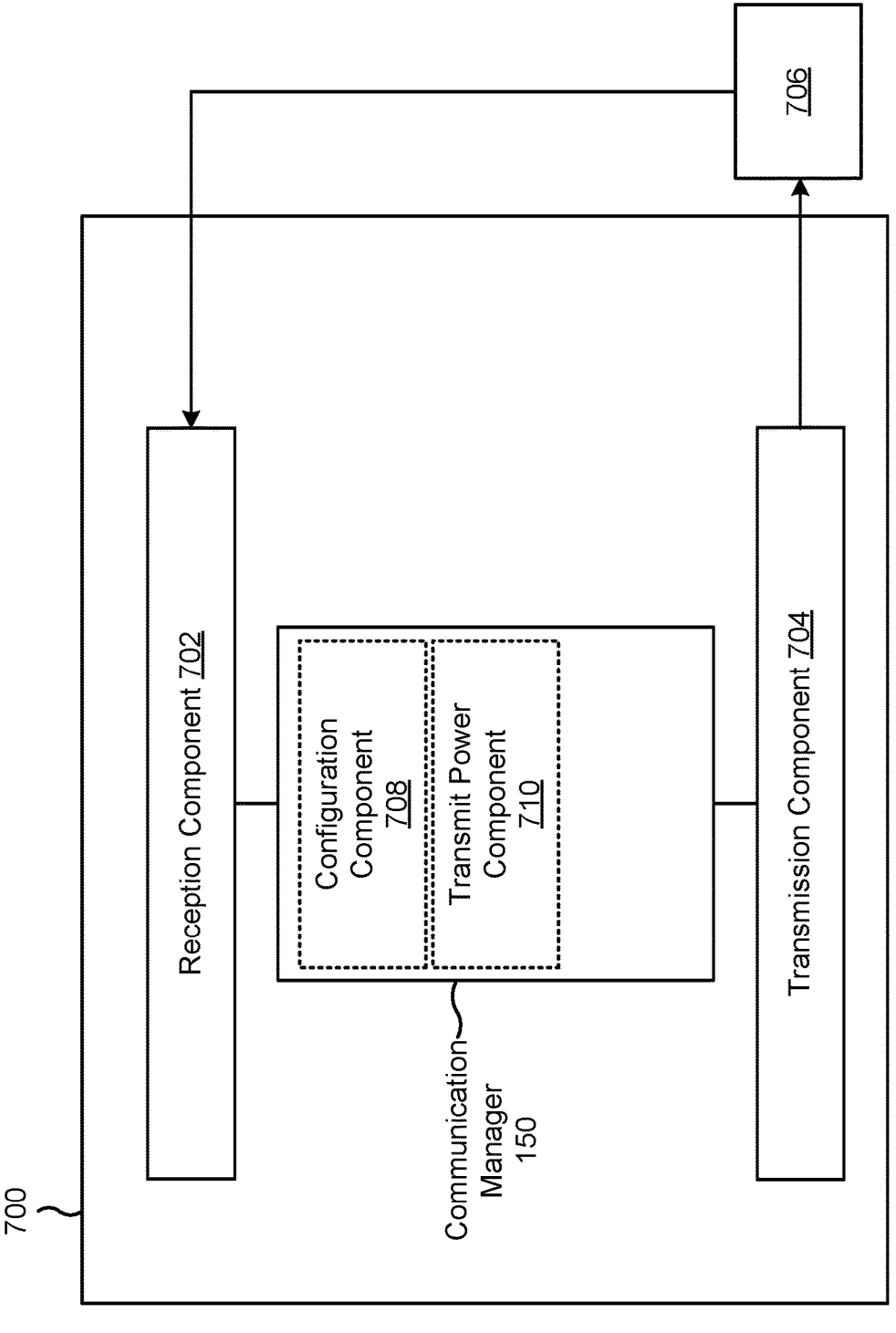
FIG. 7 is a diagram of an example apparatus for wireless communication that supports power boosting of a CSI-RS.

FIG. 7 is a diagram of an example apparatus 700 for wireless communication that supports power boosting of a CSI-RS. The apparatus 700 may be a network node, or a network node may include the apparatus 700. In some aspects, the apparatus 700 includes a reception component 702, a transmission component 704, and a communication manager 150, which may be in communication with one another (for example, via one or more buses). As shown, the apparatus 700 may communicate with another apparatus 706 (such as a UE, a network node, or another wireless communication device) using the reception component 702 and the transmission component 704.

In some aspects, the apparatus 700 may be configured to and/or operable to perform one or more operations described herein in connection with FIG. 3. Additionally or alternatively, the apparatus 700 may be configured to and/or operable to perform one or more processes described herein, such as process 500 of FIG. 5. In some aspects, the apparatus 700 may include one or more components of the network node 110 described above in connection with FIG. 2.

The reception component 702 may receive communications, such as reference signals, control information, and/or data communications, from the apparatus 706. The reception component 702 may provide received communications to one or more other components of the apparatus 700, such as the communication manager 150. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, one or more modems, one or more demodulators, one or more MIMO detectors, one or more receive processors, one or more controllers/processors, and/or one or more memories of the network node described above in connection with FIG. 2.

The transmission component 704 may transmit communications, such as reference signals, control information, and/or data communications, to the apparatus 706. In some aspects, the communication manager 150 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 704 may be co-located with the reception component 702 in one or more transceivers.

The communication manager 150 and/or the configuration component 708 may transmit or may cause the transmission component 704 to transmit, to a UE, configuration information to configure a CSI-RS resource that is associated with SBFD sets of symbols and non-SBFD sets of symbols. The communication manager 150 and/or the transmit power component 710 may identify a power-boosted EPRE associated with an instance of the CSI-RS resource that occurs in an SBFD set of symbols. The communication manager 150 and/or the transmit power component 710 may transmit or may cause the transmission component 704 to transmit, to the UE in the instance of the CSI-RS resource that occurs in the SBFD set of symbols, a CSI-RS that is associated with the power-boosted EPRE. In some aspects, the communication manager 150 may perform one or more operations described elsewhere herein as being performed by one or more components of the communication manager 150.

The communication manager 150 may include one or more controllers/processors, one or more memories, one or more schedulers, and/or one or more communication units of the network node 110 described above in connection with FIG. 2. In some aspects, the communication manager 150 includes a set of components, such as a configuration component 708, and/or a transmit power component 710. Alternatively, the set of components may be separate and distinct from the communication manager 150. In some aspects, one or more components of the set of components may include or may be implemented within one or more controllers/processors, one or more memories, one or more schedulers, and/or one or more communication units of the network node 110 described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The transmission component 704 and/or the configuration component 708 may transmit, to a UE, configuration information to configure a CSI-RS resource that is associated with SBFD sets of symbols and non-SBFD sets of symbols. The transmit power component 710 may identify a power-boosted EPRE associated with an instance of the CSI-RS resource that occurs in an SBFD set of symbols. The transmission component 704 and/or the transmit power component 710 may transmit, to the UE in the instance of the CSI-RS resource that occurs in the SBFD set of symbols, a CSI-RS that is associated with the power-boosted EPRE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed at a UE, comprising: receiving configuration information to configure a CSI-RS resource that is associated with SBFD sets of symbols and non-SBFD sets of symbols; receiving, in an instance of the CSI-RS resource that occurs in an SBFD set of symbols, a CSI-RS that is associated with a power-boosted EPRE based at least in part on the configuration information; and computing channel state information using the CSI-RS by identifying, based at least in part on the configuration information, the power-boosted EPRE.

Aspect 2: The method of Aspect 1, wherein a boosting factor associated with the power-boosted EPRE is related to a bandwidth of the instance of the CSI-RS resource that overlaps with at least one of an uplink sub-band of the SBFD set of symbols or a guard band of the SBFD set of symbols.

Aspect 3: The method of any of Aspects 1-2, wherein the configuration information includes an indication that CSI-RS EPRE power boosting is to be enabled.

Aspect 4: The method of any of Aspects 1-3, wherein the configuration information includes an indication of a boosting factor associated with the power-boosted EPRE.

Aspect 5: The method of any of Aspects 1-4, wherein the CSI-RS resource is associated with one of a periodic CSI-RS resource or a semi-persistent CSI-RS resource, and wherein at least one of: the configuration information includes an indication that CSI-RS EPRE power boosting is to be enabled, or the method further comprises receiving a MAC-CE activating the CSI-RS EPRE power boosting.

Aspect 6: The method of any of Aspects 1-5, wherein the CSI-RS resource is associated with an aperiodic CSI-RS resource, and wherein at least one of: the configuration information includes an indication that CSI-RS EPRE power boosting is to be enabled, or the method further comprises receiving a downlink control information communication activating the CSI-RS EPRE power boosting.

Aspect 7: The method of any of Aspects 1-6, wherein the configuration information indicates a power control offset parameter associated with identifying an EPRE of PDSCH communications in the SBFD sets of symbols and the non-SBFD sets of symbols, and wherein the method further comprises receiving, in the SBFD set of symbols, a PDSCH communication that is associated with a power-boosted EPRE based at least in part on the power control offset parameter.

Aspect 8: The method of any of Aspects 1-7, wherein the configuration information indicates a power control offset parameter associated with identifying an EPRE of PDSCH communications in the SBFD sets of symbols and the non-SBFD sets of symbols, and wherein the method further comprises: adjusting the power control offset parameter to account for the power-boosted EPRE associated with the CSI-RS, resulting in an adjusted power control offset parameter; and receiving, in the SBFD set of symbols, a PDSCH communication based at least in part on the adjusted power control offset parameter.

Aspect 9: The method of any of Aspects 1-8, wherein the configuration information indicates a first power control offset parameter associated with identifying an EPRE of PDSCH communications in the SBFD sets of symbols and a second power control offset parameter associated with identifying the EPRE of the PDSCH communications in the non-SBFD sets of symbols, and wherein the method further comprises receiving, in the SBFD set of symbols, a PDSCH communication based at least in part on the first power control offset parameter.

Aspect 10: A method of wireless communication performed at a network node, comprising: transmitting, to a UE, configuration information to configure a CSI-RS resource that is associated with SBFD sets of symbols and non-SBFD sets of symbols; identifying a power-boosted EPRE associated with an instance of the CSI-RS resource that occurs in an SBFD set of symbols; and transmitting, to the UE in the instance of the CSI-RS resource that occurs in the SBFD set of symbols, a CSI-RS that is associated with the power-boosted EPRE.

Aspect 11: The method of Aspect 10, wherein a boosting factor associated with the power-boosted EPRE is related to a bandwidth of the instance of the CSI-RS resource that overlaps with at least one of an uplink sub-band of the SBFD set of symbols or a guard band of the SBFD set of symbols.

Aspect 12: The method of any of Aspects 10-11, wherein the configuration information includes an indication that CSI-RS EPRE power boosting is to be enabled.

Aspect 13: The method of any of Aspects 10-12, wherein the configuration information includes an indication of a boosting factor associated with the power-boosted EPRE.

Aspect 14: The method of any of Aspects 10-13, wherein the CSI-RS resource is associated with one of a periodic CSI-RS resource or a semi-persistent CSI-RS resource, and wherein at least one of: the configuration information includes an indication that CSI-RS EPRE power boosting is to be enabled, or the method further comprises transmitting, to the UE, a MAC-CE activating the CSI-RS EPRE power boosting.

Aspect 15: The method of any of Aspects 10-14, wherein the CSI-RS resource is associated with an aperiodic CSI-RS resource, and wherein at least one of: the configuration information includes an indication that CSI-RS EPRE power boosting is to be enabled, or the method further comprises transmitting, to the UE, a downlink control information communication activating the CSI-RS EPRE power boosting.

Aspect 16: The method of any of Aspects 10-15, wherein the configuration information indicates a power control offset parameter associated with the UE identifying an EPRE of PDSCH communications in the SBFD sets of symbols and the non-SBFD sets of symbols, and wherein the method further comprises transmitting, to the UE in the SBFD set of symbols, a PDSCH communication that is associated with a power-boosted EPRE based at least in part on the power control offset parameter.

Aspect 17: The method of any of Aspects 10-16, wherein the configuration information indicates a power control offset parameter associated with the UE identifying an EPRE of PDSCH communications in the SBFD sets of symbols and the non-SBFD sets of symbols, and wherein the method further comprises transmitting, to the UE in the SBFD set of symbols, a PDSCH communication based at least in part on an adjusted power control offset parameter that accounts for the power-boosted EPRE associated with the CSI-RS.

Aspect 18: The method of any of Aspects 10-17, wherein the configuration information indicates a first power control offset parameter associated with identifying an EPRE of PDSCH communications in the SBFD sets of symbols and a second power control offset parameter associated with identifying the EPRE of the PDSCH communications in the non-SBFD sets of symbols, and wherein the method further comprises transmitting, to the UE in the SBFD set of symbols, a PDSCH communication based at least in part on the first power control offset parameter.

Aspect 19: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-18.

Aspect 20: An apparatus for wireless communication at a device, the apparatus comprising one or more memories and one or more processors coupled to the one or more memories, the one or more processors configured to cause the device to perform the method of one or more of Aspects 1-18.

Aspect 21: An apparatus for wireless communication, the apparatus comprising at least one means for performing the method of one or more of Aspects 1-18.

Aspect 22: A non-transitory computer-readable medium storing code for wireless communication, the code comprising instructions executable by one or more processors to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

Aspect 24: A device for wireless communication, the device comprising a processing system that includes one or more processors and one or more memories coupled with the one or more processors, the processing system configured to cause the device to perform the method of one or more of Aspects 1-18.

Aspect 25: An apparatus for wireless communication at a device, the apparatus comprising one or more memories and one or more processors coupled to the one or more memories, the one or more processors individually or collectively configured to cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions. The term "identify" or "identifying" also encompasses a wide variety of actions and, therefore, "identifying" can include calculating, computing, processing, deriving, investigating, looking up (such as via looking up in a table, a database or another data structure), inferring, ascertaining, measuring, and the like. Also, "identifying" can include receiving (such as receiving information or receiving an indication), accessing (such as accessing data stored in memory), transmitting (such as transmitting information) and the like. Also, "identifying" can include resolving, selecting, obtaining, choosing, establishing and other such similar actions.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:

one or more memories storing processor-executable code; and one or more processors coupled with the one or more memories, at least one processor of the one or more processors configured to cause the UE to:

receive configuration information to configure a channel state information reference signal (CSI-RS) resource that is associated with sub-band full duplex (SBFD) sets of symbols and non-SBFD sets of symbols;

receive, in an instance of the CSI-RS resource that occurs in an SBFD set of symbols, a CSI-RS that is associated with a power-boosted energy per resource element (EPRE) based at least in part on the configuration information, wherein a boosting factor associated with the power-boosted EPRE is related to a bandwidth of the instance of the CSI-RS resource that overlaps with at least one of an uplink sub-band of the SBFD set of symbols or a guard band of the SBFD set of symbols; and compute channel state information using the CSI-RS by identifying, based at least in part on the configuration information, the power-boosted EPRE.

2. The apparatus of claim 1, wherein the configuration information includes an indication that CSI-RS EPRE power boosting is to be enabled.

3. The apparatus of claim 1, wherein the configuration information includes an indication of a boosting factor associated with the power-boosted EPRE.

4. The apparatus of claim 1, wherein the CSI-RS resource is associated with one of a periodic CSI-RS resource or a semi-persistent CSI-RS resource, and wherein at least one of:

the configuration information includes an indication that CSI-RS EPRE power boosting is to be enabled, or at least one processor of the one or more processors is configured to receive a medium access control (MAC) control element (MAC-CE) activating the CSI-RS EPRE power boosting.

5. The apparatus of claim 1, wherein the CSI-RS resource is associated with an aperiodic CSI-RS resource, and wherein at least one of:

the configuration information includes an indication that CSI-RS EPRE power boosting is to be enabled, or at least one processor of the one or more processors is configured to receive a downlink control information communication activating the CSI-RS EPRE power boosting.

6. The apparatus of claim 1, wherein the configuration information indicates a power control offset parameter associated with identifying an EPRE of physical downlink shared channel (PDSCH) communications in the SBFD sets of symbols and the non-SBFD sets of symbols, and wherein at least one processor of the one or more processors is configured to receive, in the SBFD set of symbols, a PDSCH communication that is associated with a power-boosted EPRE based at least in part on the power control offset parameter.

7. The apparatus of claim 1, wherein the configuration information indicates a power control offset parameter associated with identifying an EPRE of physical downlink shared channel (PDSCH) communications in the SBFD sets of symbols and the non-SBFD sets of symbols, and wherein the at least one processor of the one or more processors is configured to:

adjust the power control offset parameter to account for the power-boosted EPRE associated with the CSI-RS, resulting in an adjusted power control offset parameter; and receive, in the SBFD set of symbols, a PDSCH communication based at least in part on the adjusted power control offset parameter.

8. The apparatus of claim 1, wherein the configuration information indicates a first power control offset parameter associated with identifying an EPRE of physical downlink shared channel (PDSCH) communications in the SBFD sets of symbols and a second power control offset parameter associated with identifying the EPRE of the PDSCH communications in the non-SBFD sets of symbols, and wherein the at least one processor of the one or more processors is configured to receive, in the SBFD set of symbols, a PDSCH communication based at least in part on the first power control offset parameter.

9. An apparatus for wireless communication at a network node, comprising:

one or more memories storing processor-executable code; and one or more processors coupled with the one or more memories, at least one processor of the one or more processors configured to cause the network node to:

transmit, to a user equipment (UE), configuration information to configure a channel state information reference signal (CSI-RS) resource that is associated with sub-band full duplex (SBFD) sets of symbols and non-SBFD sets of symbols;

identify a power-boosted energy per resource element (EPRE) associated with an instance of the CSI-RS resource that occurs in an SBFD set of symbols, wherein a boosting factor associated with the power-boosted EPRE is related to a bandwidth of the instance of the CSI-RS resource that overlaps with at least one of an uplink sub-band of the SBFD set of symbols or a guard band of the SBFD set of symbols; and transmit, to the UE in the instance of the CSI-RS resource that occurs in the SBFD set of symbols, a CSI-RS that is associated with the power-boosted EPRE.

10. The apparatus of claim 9, wherein the configuration information includes an indication that CSI-RS EPRE power boosting is to be enabled.

11. The apparatus of claim 9, wherein the configuration information includes an indication of a boosting factor associated with the power-boosted EPRE.

12. The apparatus of claim 9, wherein the CSI-RS resource is associated with one of a periodic CSI-RS resource or a semi-persistent CSI-RS resource, and wherein at least one of:

the configuration information includes an indication that CSI-RS EPRE power boosting is to be enabled, or the at least one processor of the one or more processors is configured to transmit, to the UE, a medium access control (MAC) control element (MAC-CE) activating the CSI-RS EPRE power boosting.

13. The apparatus of claim 9, wherein the CSI-RS resource is associated with an aperiodic CSI-RS resource, and wherein at least one of:

the configuration information includes an indication that CSI-RS EPRE power boosting is to be enabled, or the at least one processor of the one or more processors is configured to transmit, to the UE, a downlink control information communication activating the CSI-RS EPRE power boosting.

14. The apparatus of claim 9, wherein the configuration information indicates a power control offset parameter associated with the UE identifying an EPRE of physical downlink shared channel (PDSCH) communications in the SBFD sets of symbols and the non-SBFD sets of symbols, and wherein the at least one processor of the one or more processors is configured to transmit, to the UE in the SBFD set of symbols, a PDSCH communication that is associated with a power-boosted EPRE based at least in part on the power control offset parameter.

15. The apparatus of claim 9, wherein the configuration information indicates a power control offset parameter associated with the UE identifying an EPRE of physical downlink shared channel (PDSCH) communications in the SBFD sets of symbols and the non-SBFD sets of symbols, and wherein the at least one processor of the one or more processors is configured to transmit, to the UE in the SBFD set of symbols, a PDSCH communication based at least in part on an adjusted power control offset parameter that accounts for the power-boosted EPRE associated with the CSI-RS.

16. The apparatus of claim 9, wherein the configuration information indicates a first power control offset parameter associated with identifying an EPRE of physical downlink shared channel (PDSCH) communications in the SBFD sets of symbols and a second power control offset parameter associated with identifying the EPRE of the PDSCH communications in the non-SBFD sets of symbols, and wherein at least one processor of the one or more processors is configured to transmit, to the UE in the SBFD set of symbols, a PDSCH communication based at least in part on the first power control offset parameter.

17. A method of wireless communication performed at a user equipment (UE), comprising:

receiving configuration information to configure a channel state information reference signal (CSI-RS) resource that is associated with sub-band full duplex (SBFD) sets of symbols and non-SBFD sets of symbols;

receiving, in an instance of the CSI-RS resource that occurs in an SBFD set of symbols, a CSI-RS that is associated with a power-boosted energy per resource element (EPRE) based at least in part on the configuration information, wherein a boosting factor associated with the power-boosted EPRE is related to a bandwidth of the instance of the CSI-RS resource that overlaps with at least one of an uplink sub-band of the SBFD set of symbols or a guard band of the SBFD set of symbols; and computing channel state information using the CSI-RS by identifying, based at least in part on the configuration information, the power-boosted EPRE.

18. The method of claim 17, wherein the configuration information includes an indication of a boosting factor associated with the power-boosted EPRE.

19. The method of claim 17, wherein the CSI-RS resource is associated with an aperiodic CSI-RS resource, and wherein at least one of:

the configuration information includes an indication that CSI-RS EPRE power boosting is to be enabled, or the method further comprises receiving a downlink control information communication activating the CSI-RS EPRE power boosting.

20. The method of claim 17, wherein the configuration information indicates a power control offset parameter associated with identifying an EPRE of physical downlink shared channel (PDSCH) communications in the SBFD sets of symbols and the non-SBFD sets of symbols, and wherein the method further comprises:

adjusting the power control offset parameter to account for the power-boosted EPRE associated with the CSI-RS, resulting in an adjusted power control offset parameter; and receiving, in the SBFD set of symbols, a PDSCH communication based at least in part on the adjusted power control offset parameter.

21. The method of claim 17, wherein the configuration information indicates a first power control offset parameter associated with identifying an EPRE of physical downlink shared channel (PDSCH) communications in the SBFD sets of symbols and a second power control offset parameter associated with identifying the EPRE of the PDSCH communications in the non-SBFD sets of symbols, and wherein the method further comprises receiving, in the SBFD set of symbols, a PDSCH communication based at least in part on the first power control offset parameter.

22. A method of wireless communication performed at a network node, comprising:

transmitting, to a user equipment (UE), configuration information to configure a channel state information reference signal (CSI-RS) resource that is associated with sub-band full duplex (SBFD) sets of symbols and non-SBFD sets of symbols;

identifying a power-boosted energy per resource element (EPRE) associated with an instance of the CSI-RS resource that occurs in an SBFD set of symbols, wherein a boosting factor associated with the power-boosted EPRE is related to a bandwidth of the instance of the CSI-RS resource that overlaps with at least one of an uplink sub-band of the SBFD set of symbols or a guard band of the SBFD set of symbols; and transmitting, to the UE in the instance of the CSI-RS resource that occurs in the SBFD set of symbols, a CSI-RS that is associated with the power-boosted EPRE.

23. The method of claim 22, wherein the configuration information includes an indication that CSI-RS EPRE power boosting is to be enabled.

24. The method of claim 22, wherein the CSI-RS resource is associated with one of a periodic CSI-RS resource or a semi-persistent CSI-RS resource, and wherein at least one of:

the configuration information includes an indication that CSI-RS EPRE power boosting is to be enabled, or the method further comprises transmitting, to the UE, a medium access control (MAC) control element (MAC-CE) activating the CSI-RS EPRE power boosting.

25. The method of claim 22, wherein the configuration information indicates a power control offset parameter associated with the UE identifying an EPRE of physical downlink shared channel (PDSCH) communications in the SBFD sets of symbols and the non-SBFD sets of symbols, and wherein the method further comprises transmitting, to the UE in the SBFD set of symbols, a PDSCH communication that is associated with a power-boosted EPRE based at least in part on the power control offset parameter.

26. The method of claim 22, wherein the configuration information indicates a power control offset parameter associated with the UE identifying an EPRE of physical downlink shared channel (PDSCH) communications in the SBFD sets of symbols and the non-SBFD sets of symbols, and wherein the method further comprises transmitting, to the UE in the SBFD set of symbols, a PDSCH communication based at least in part on an adjusted power control offset parameter that accounts for the power-boosted EPRE associated with the CSI-RS.

27. The method of claim 22, wherein the configuration information indicates a first power control offset parameter associated with identifying an EPRE of physical downlink shared channel (PDSCH) communications in the SBFD sets of symbols and a second power control offset parameter associated with identifying the EPRE of the PDSCH communications in the non-SBFD sets of symbols, and wherein the method further comprises transmitting, to the UE in the SBFD set of symbols, a PDSCH communication based at least in part on the first power control offset parameter.

* * * * *